United States Patent
Mizutani

(10) Patent No.: US 6,288,731 B1
(45) Date of Patent: Sep. 11, 2001

(54) FREE DEFORMATION OF IMAGE DATA

(75) Inventor: Kenichi Mizutani, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/186,849

(22) Filed: Nov. 5, 1998

(30) Foreign Application Priority Data

Nov. 17, 1997 (JP) .................................................. 9-315656

(51) Int. Cl.$^7$ .................................................. G06F 12/06
(52) U.S. Cl. ................................................ 345/572; 345/536
(58) Field of Search ................................ 345/501, 530, 345/536, 572, 437, 438, 126, 127, 545

(56) References Cited

U.S. PATENT DOCUMENTS

| 5,241,659 | * | 8/1993 | Parulski et al. ............... | 345/508 |
| 5,680,531 | * | 10/1997 | Litwinowicz et al. ............... | 345/473 |

FOREIGN PATENT DOCUMENTS

| 63-44688 | 2/1988 | (JP) . | | |
| 4-280161 | 10/1992 | (JP) . | | |
| 5-61970 | 3/1993 | (JP) . | | |
| 07-204347 | 8/1995 | (JP) . | | |
| 7-219499 | 8/1995 | (JP) . | | |
| 8-44736 | 2/1996 | (JP) . | | |
| 044736 (AB) | * | 2/1996 | (JP) .............................. | G06F/17/24 |
| 10-039856 | 2/1998 | (JP) . | | |

* cited by examiner

Primary Examiner—Kee M. Tung
(74) Attorney, Agent, or Firm—Scully, Scott, Murphy & Presser

(57) ABSTRACT

In an image processing apparatus, a figure data storage unit stores a figure data for a figure, and pixels of the figure data are allocated with figure data addresses. A display buffer unit stores a display figure data, and an object table unit stores an object table which storing a set of display parameters for a deformed figure of the figure. The object table unit outputs the set of display parameters in response to an object designating instruction. An address generating unit stores at least a form table which stores ones of the figure data addresses for the deformed figure as deformed figure addresses. The address generating unit outputs, as read addresses, addresses including the deformed figure addresses to the figure data storage unit based on the set of display parameters supplied from the object table unit to read out at least a portion of the figure data from the figure data storage unit, and stores the read out figure data portion in the display buffer unit as the display figure data.

28 Claims, 15 Drawing Sheets

HORIZONTAL PIXEL POSITION VALUE

FREE DEFORMATION OF IMAGE DATA

BACKGROUND OF THE INVENTION

1. Field of the Invention

The present invention relates to an image processing apparatus and an image processing method and, more particularly, to an image processing apparatus and an image processing method in which a function is performed to freely deform a two-dimensional image data.

2. Description of the Related Art

Conventionally a two-dimensional graphic is displayed in a definite form. However, the need of free deformation of the two-dimensional graphic is increased in conjunction with a technical development with regard to a graphic process.

FIG. 1 is a block diagram showing the structure of a conventional two-dimensional image processing apparatus. The two-dimensional image processing apparatus is composed of a CPU 11, and a two-dimensional (2D) graphic processor 12 connected to the CPU 11. A figure ROM 13 and a display buffer section 14 are connected to the 2D graphic processor 12. The 2D graphic processor 12 is composed of a DATA I/F section 15, an object table section (hereinafter, to be referred to as an OBJ table section) 16, an FI/FO section 17 composed of first-in first-out registers, a timing signal generating section 19, a ROM address adder 20, a ROM address generating counter 21 and a display buffer section address adder 22.

FIG. 2 is a flowchart showing an operation of the conventional two-dimensional image processing apparatus. When the CPU 11 sends a CPU data signal S3 to the DATA I/F section 15, the DATA I/F section 15 outputs an OBJ table section setting data signal S4 to the OBJ table 16 to set a record of display parameters of respective figures (Step S1), if the CPU data signal S3 is a signal to be directed to the OBJ table 16. An X coordinate origin value P1, a Y coordinate origin value P2 and a display figure ROM origin value P3 are given as the display parameters of the OBJ table 16. On the other hand, the DATA I/F section 15 outputs an FI/FO setting data signal S5 to the FI/FO section 17 to set OBJ addresses PA included in the signal S5, if the CPU data signal S3 is a signal to be directed to the FI/FO section 17.

The FI/FO section 17 switches an FI/FO section empty signal S8 directed to the timing signal generating section 19 from a disable state to an enable state at a time point when the OBJ addresses PA are set therein. Accordingly, the timing signal generating section 19 is initialized to be set to a drawing state. In this state, the timing signal generating section 19 and the display buffer section 14 are set to an active state in response to a vertical synchronous signal S1. At that time, if the FI/FO section empty signal S8 is in the disable state, the 2D graphic processor 12 does not operate until a next horizontal synchronization signal S2 is inputted. If the FI/FO section empty signal S8 is in the enable state, when the timing signal generating section 19 outputs an FI/FO section request signal S7 to the FI/FO section 17 in response to the horizontal synchronous signal. The FI/FO section 17 outputs an OBJ table section address signal S6 to the OBJ table 16 in response to the FI/FO section request signal S7 to read out the parameters of the figure data to be displayed (Steps ST2 to ST4).

After the respective parameters of the figure data are outputted from the OBJ table 16, the timing signal generating section 19 outputs a ROM calculation control signal S21 to the ROM address generating counter 21. The ROM address generating counter 21 receives the ROM calculation control signal S21 as a start signal, and then generates and outputs a ROM address generating counter output signal S13. On the other hand, the ROM address adder 20 adds the ROM address generating counter output signal S13 and the display figure ROM origin value P3 included in a figure ROM address origin signal S11 supplied from the OBJ table 16 to generate and output a figure ROM address signal S12 to the figure ROM 13 (Step S5).

The figure ROM 13 outputs a display buffer section data signal S15 having a desired figure data to the display buffer section 14 based on the figure ROM address signal S12. At the same time, the display buffer section address adder 22 adds the ROM address generating counter output signal S13 and each of the X coordinate origin value P1 included in an X coordinate origin signal S9 supplied from the OBJ table 16 and the Y coordinate origin value P2 included in a Y coordinate origin signal S10 to determine a display position where the figure is to be displayed, and then outputs a generated display buffer section address signal S17 to the display buffer section 14.

While the display buffer section data signal S15 and the display buffer section address signal S17 are outputted, a display buffer enable signal S16 supplied from the ROM address generating counter 21 is switched from the disable state to the enable state. Thus, the figure data is stored in the display buffer section 14 in accordance with the display positions of the figure data.

The timing signal generating section 19 determines the state of the FI/FO section empty signal S8 sent from the FI/FO section 17. The timing signal generating section 19 repeats this operation until this signal S8 is switched to the disable state. Also, the figure data sent from the figure ROM 13 is stored in the display buffer section 14. At a time point when all the pixel data of a single figure for the horizontal line is stored in the display buffer section 14, the display buffer enable signal S16 is switched from the enable state to the disable state. Thus, the operation for the horizontal line is ended (Step ST6). The above operation is repeated for all the horizontal lines.

Next, all the data stored in the display buffer section 14 are outputted to a display device (not shown). Through the repetition of the above mentioned operation, the figure data can be displayed on the screen.

A procedure when a display figure example 1 (sp1) and a display figure example 2 (sp2) are set to be displayed on the screen as a display screen example 1 (SC1), and the display figure examples 1 and 2 are deformed as shown as a display screen example 2 (SC2), a display screen example 3 (SC3) and a display screen example 4 (SC4) in this order will be described below. FIGS. 3A to 3D show the display figure example 1 (sp1) on the coordinates (x1,y1) of the display screen and the display figure example 2 (sp2) on the coordinates (x2,y2). FIG. 4 is a schematic diagram showing the content of a conventional figure ROM mapping.

In a display screen example 1 (SC1) of FIG. 3A, a figure ROM data 1 (RD1) mapped into an address R1(h) of the figure ROM 13 shown in FIG. 4 is displayed as a display figure example 1 (sp1), and a figure ROM data 2 (RD2) mapped into an address R2(h) is also displayed as a display figure example 2 (sp2). For example, when the respective parameters of the display figure example 1 (sp1) are to be set in an address a(h) of the OBJ table 16, the CPU 11 sets x1(h) to the X coordinate origin value P1, y1(h) to the Y coordinate origin value P2, and R1(h) to the display figure ROM origin value P3, respectively. Also, when the respective parameters of the display figure example 2 (sp2) are set in an address b(h) of the OBJ table 16, the CPU 11 sets x2(h) to the X coordinate origin value P1, y2(h) to the Y coordinate origin value P2 and R2(h) in the display figure ROM origin value P3, respectively. Moreover, the CPU 11 sets the addresses a(h) and b(h) of the OBJ table 16 to the FI/FO section 17. Thus, the display screen example 1 (SC1) can be displayed on the screen through the above mentioned operation.

When the display figure example 1 and the display figure example 2 are deformed as shown as the display screen example 2 (SC2) in FIG. 3B, the figure ROM data 3 (RD3) is mapped into an address R3(h) of the figure ROM 13, and the figure ROM data 4 (RD4) is mapped into an address R4(h) such that they are used as the display figure example 3 (sp3) and the display figure example 4 (sp4). At that time, the CPU 11 sets R3(h) to the display figure ROM origin value P3 of the OBJ table 16 when setting the display figure example 3 (sp3) in the address a(h) of the OBJ table 16. Also, the CPU 11 sets R4(h) to the display figure ROM origin value P3 of the OBJ table 16 when setting the display figure example 4 (sp4) in the address b(h). Next, the CPU 11 sets the addresses a(h) and b(h) of the OBJ table 16 to the FI/FO section 17, respectively. Thus, the display screen example 2 (SC2) is displayed on the screen through the above mentioned operation.

Also, when the display figure example 3 and the display figure example 4 are deformed as shown as the display screen example 3 (SC3) in FIG. 3C, a figure ROM data 5 (RD5) is mapped into an address R5(h) of the figure ROM 13 and a figure ROM data 6 (RD6) is mapped into R6(h) of the figure ROM 13 such that they are used as the display figure example (sp5) and the display figure example (sp6). At that time, the CPU 11 sets the R5(h) to the display figure ROM origin value P3 of the OBJ table section 16 when setting the display figure example 5 (sp5) in the address a(h) of the OBJ table 16. Also, the CPU 11 sets the R6(h) to the display figure ROM origin value P3 of the OBJ table 16 when setting the display figure example 6 (sp6) in the address b(h). Next, the CPU 11 sets the addresses a(h) and b(h) of the OBJ table 16 to the FI/FO section 17, respectively. Thus, the display screen example 3 (SC3) is displayed on the screen through the above mentioned operations.

Moreover, when the display figure example 3 and the display figure example 4 are deformed as shown as the display screen example 4 (SC4) in FIG. 3D, a figure ROM data 7 (RD7) is mapped into an address R7(h) of the figure ROM 13 and a figure ROM data 8 (RD8) is mapped into R8(h) of the figure ROM 13 such that they are used as a display figure example 7 (sp7) and a display figure example 8 (sp8). At that time, the CPU 11 sets the R7(h) to the display figure ROM origin value P3 when setting the display figure example 1 (sp1) in the address a(h) of the OBJ table 16, and sets the R8(h) to the display figure ROM origin value P3 when setting the display figure example 2 (sp2) in the address b(h). Next, the CPU 11 sets the addresses a(h) and b(h) of the OBJ table 16 to the FI/FO section 17, respectively. Thus, the display screen example 4 (SC4) is displayed on the screen through the above mentioned operations.

As mentioned above, in the conventional two-dimensional image processing apparatus, the deformation of the figure is performed while the figure data in a fixed form is set at a specified coordinate position at each time. Therefore, a figure corresponding to any figure data other than the figure data stored in the figure ROM 13 cannot be processed. Also, the figure data after the deformation must be all stored in the figure ROM 13. Thus, the ROM capacity necessary for the figure data after the deformation is extremely large.

SUMMARY OF THE INVENTION

The present invention is accomplished in the viewpoint of the above mentioned problems. It is therefore an object of the present invention to provide an image processing apparatus and an image processing method, in which a figure deforming process can be freely carried out and further an amount of information required for the free figure deforming process can be reduced so that a ROM capacity can be also reduced.

In order to achieve an aspect of the present invention, an image processing apparatus include a figure data storage unit for storing a figure data for a figure, pixels of the figure data being allocated with figure data addresses, a display buffer unit for storing a display figure data, and an object table unit for storing an object table which storing a set of display parameters for a deformed figure of the figure, the object table unit outputs the set of display parameters in response to an object designating instruction. An address generating unit stores at least a form table which stores ones of the figure data addresses for the deformed figure as deformed figure addresses. The address generating unit outputs, as read addresses, addresses including the deformed figure addresses to the figure data storage unit based on the set of display parameters supplied from the object table unit to read out at least a portion of the figure data from the figure data storage unit, and stores the read out figure data portion in the display buffer unit as the display figure data.

In an image processing apparatus, a host unit may set the form table in the address generating unit and the set of display parameters in the object table unit. Also, when the deformed figure is deformed to produce a twice deformed figure, the host unit may set a new form table corresponding to the twice deformed figure in the address generating unit, and a new set of display parameters in the object table unit.

In an image processing apparatus, the deformation is at least one of a shifting operation, a rotating operation, and a shifting and rotating operation of the figure.

When the deformation is performed one after another, the object table stores a plurality of sets of display parameters, and the address generating unit includes a plurality of form tables, and the address generating unit includes an instruction storage unit for storing a plurality of the object designating instructions for the deformations.

If the set of display parameters includes a data indicative of a display position where the deformed figure is displayed, the address generating unit may generate reference addresses and outputs display buffer storage addresses based on the display position data and the reference addresses, when the read out figure data portion is stored in the display buffer unit.

The set of display parameters may include a figure data designating data for designating the figure data and a form table designating data for designating for the form table. In this case, the address generating unit includes a figure data address generating unit for generating reference addresses based on the form table designating data, a form table storage unit for storing the form table, and for generating the deformed figure addresses based on the reference addresses generated by the figure data address generating unit, a selector unit for selecting one of the reference addresses supplied from the figure data address generating unit and the deformed figure addresses based on an address selection control instruction, and an address adder for adding the figure data designating data and the selected addresses to output to the figure data storage unit as the read addresses. Further, the address generating unit may further include a free deformation determining unit for determining whether or not there is any form table corresponding to the form table designating data, and for outputting the address selection control instruction to the selector unit based on the determining result. At that time, the selector unit selects the deformed figure addresses when it is determined that there is the form table corresponding to the form table designating data in the form table storage unit, and the figure data addresses when it is determined that there is not any form table corresponding to the form table designating data in the form table storage unit.

Also, when the form table has a data indicative of a size of the deformed figure, the figure data address generating unit generates the reference addresses based on the deformed figure size data when it is determined that there is the form table corresponding to the form table designating data in the form table storage unit.

In an image processing apparatus, when the object table unit stores another set of display parameters for the figure data stored in the figure data storage unit, the address generating unit stores the figure data addresses for the figure, and outputs the figure data addresses as the read addresses to the figure data storage unit before the deformation of the figure.

In this case, the address generating unit includes a figure data address generating unit for generating reference addresses based on the form table designating data, a form table storage unit for storing the form table, and for generating the deformed figure addresses based on the reference addresses generated by the figure data address generating unit, and an address adder for adding the figure data designating data and the deformed figure addresses to output to the figure data storage unit as the read addresses.

Also, when the form table has a data indicative of a size of the deformed figure, the figure data address generating unit may generate the addresses based on the deformed figure size data.

In order to achieve another aspect of the present invention, a method of displaying a freely deformed image include the steps of:

outputting a set of display parameters of an object table in response to an object designating instruction, an object table storing the set of display parameters for a deformed figure of an original figure;

outputting, as read addresses, addresses including deformed figure addresses to a figure data storage unit based on the set of display parameters to read out at least a portion of a figure data from the figure data storage unit, wherein a figure data storage unit stores the figure data for the original figure, pixels of the figure data being allocated with figure data addresses, and a form table stores ones of the figure data addresses for the deformed figure as the deformed figure addresses; and storing the read out figure data portion in a display buffer unit as the display figure data.

BRIEF DESCRIPTION OF THE DRAWINGS

FIGS. 9A and 9C show the display figure examples 1 and 2, and FIGS. 9B and 9D shows the display figure examples 3 and 4 after the display figure examples 1 and 2 are deformed;

FIGS. 10A and 10C show the display figure examples 1 and 2, and FIGS. 10B and 10D shows the display figure examples 5 and 6 after the display figure examples 3 and 4 are deformed;

FIGS. 11A and 11C show the display figure examples 1 and 2, and FIGS. 11B and 11D shows the display figure examples 7 and 8 after the display figure examples 5 and 6 are deformed;

DESCRIPTION OF THE PREFERRED EMBODIMENTS

The two-dimensional image processing apparatus of the present invention will be described below in detail with reference to the attached drawings.

Figure 5:
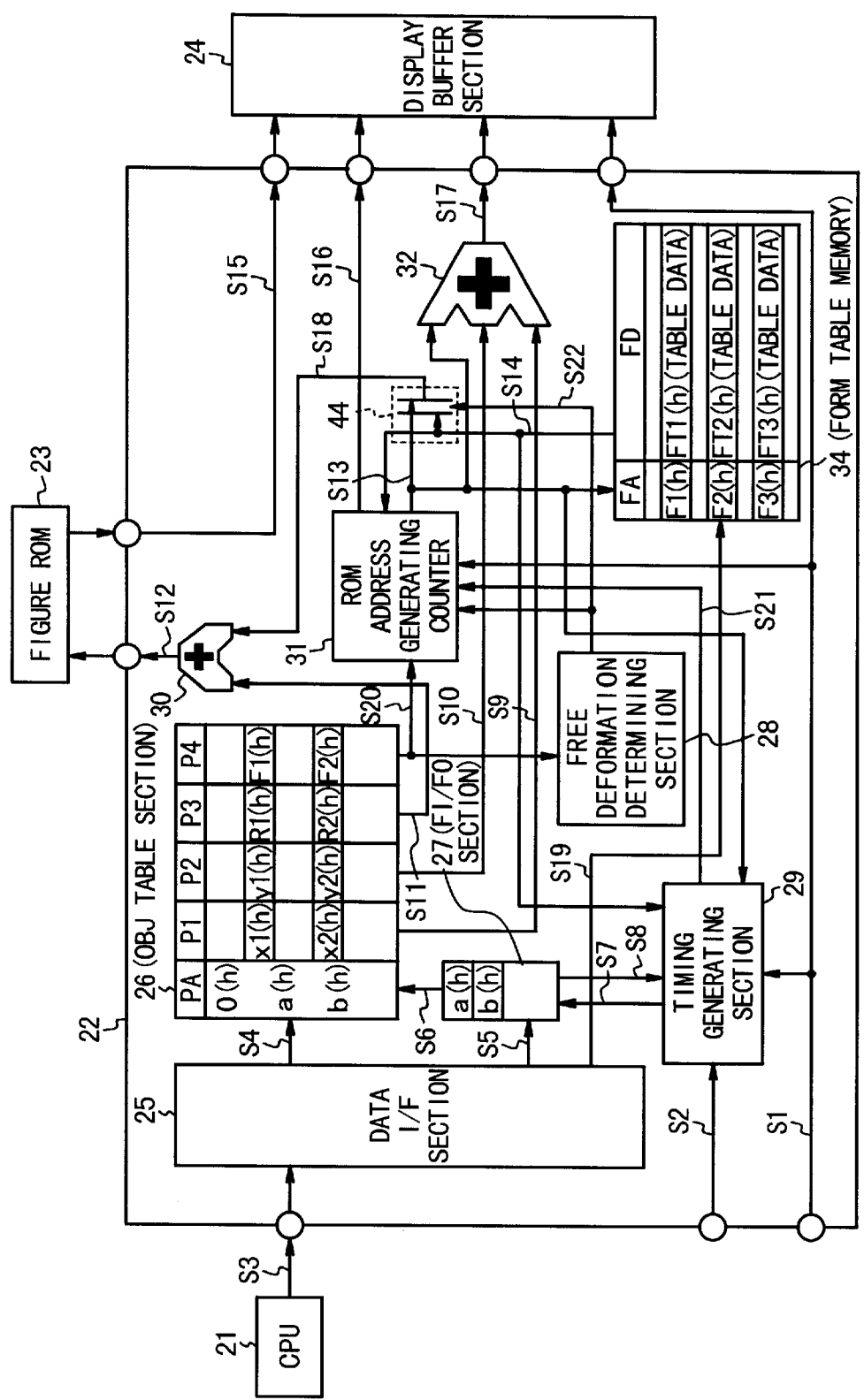
FIG. 5 is a block diagram of the structure of a two-dimensional image processing apparatus according to a first embodiment of the present invention.

FIG. 5 is a block diagram showing the structure of a two-dimensional image processing apparatus according to the first embodiment of the present invention. The two-dimensional image processing apparatus is composed of a CPU 21 and a two-dimensional (2D) graphic processor 22 connected to the CPU 21. A figure ROM 23 and a display buffer section 24 are connected to the 2D graphic processor 22. The 2D graphic processor 22 is composed of a DATA I/F section 25, an object (OBJ) table section 26, an FI/FO section 27 composed of first-in first-out registers, a free deformation determining section 28, a timing signal generating section 29, a ROM address adder 30, a ROM address generating counter 31, a display buffer section address adder 32, a form table memory 34 and a selector section 44.

The figure ROM 23 stores at least one figure data in addresses from a start address. Each of pixels of the figure data is allocated with an address using the address of the pixel on the upper left corner position as a reference address.

The OBJ table section 26 stores at least a record of display parameters for a figure to be displayed. The record has an OBJ table address (PA), an X coordinate origin value (P1) and an a Y coordinate origin value (P2) where the figure is displayed on the screen of a display unit (not shown), and a display figure ROM origin value (P3) which indicates the start address of the figure ROM 23 for the figure data corresponding to the figure, and a form table address origin value (P4) which indicates a start address of the form table of the form table memory 34 for the figure data corresponding to the figure.

The FI/FO section stores the OBJ table addresses for the figures to be displayed.

The form table memory 34 stores at least one form table. The form table is allocated with a form table address and stores the addresses of the figure ROM 23 for the figure data.

Figure 6:
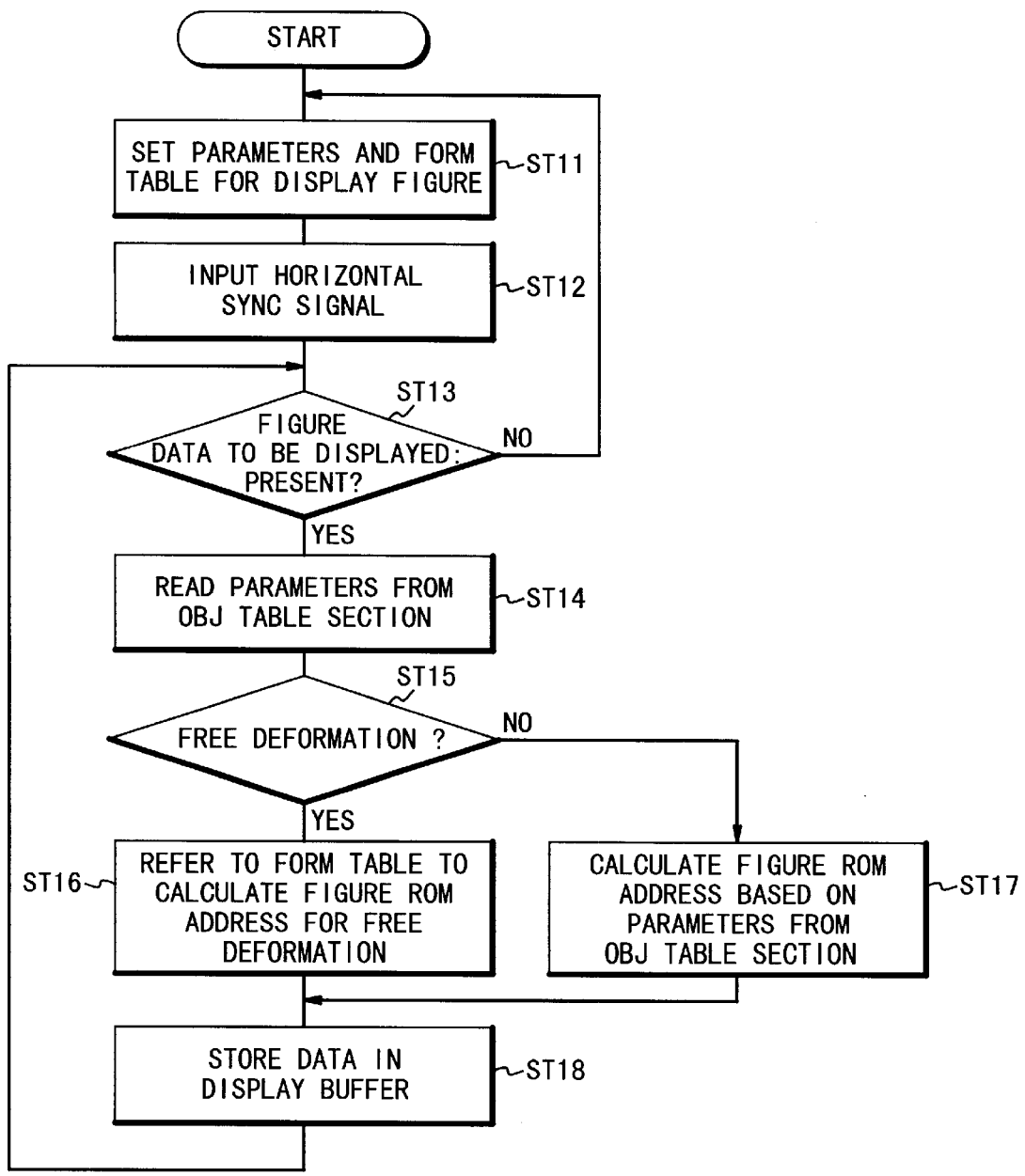
FIG. 6 is a flowchart showing an operation of the two-dimensional image processing apparatus according to the first embodiment.

FIG. 6 is a flowchart showing an operation of the two-dimensional image processing apparatus according to the first embodiment of the present invention.

Referring to FIG. 6, when the CPU 21 as a host apparatus sends a CPU data signal S3 to the DATA I/F section 25, the DATA I/F section 25 outputs an OBJ table section setting data signal S4 to the OBJ table section 26 such that display parameters of respective figures are set, if the CPU data signal S3 is a signal directed to the OBJ table section 26 (Step ST11). An X coordinate origin value P1, a Y coordinate origin value P2, a display figure ROM origin value P3 and a form table address origin value P4 are given from the OBJ table section 26 as the display parameters. The DATA I/F section 25 outputs an FI/FO setting data signal S5 to the FI/FO section 27 such that the figure is set on the basis of an OBJ address signal PA included in the signal S5, if the CPU data signal S3 is a signal to be directed to the FI/FO section 27. The DATA I/F section 25 outputs a form table section setting data signal S19 to the form table memory 34 such that form table data values FD are set in a form table having a form table address value FA of the memory 34, if the CPU data signal S3 is a signal to be directed to the form table memory 34.

The FI/FO section 27 switches an FI/FO section empty signal S8, which is a signal to be directed to the timing signal generating section 29, from a disable state to an enable state at a time point when the figure data is set in the figure ROM 23, the records are set in the OBJ table, the form tables are set in the form table memory 34 and the OBJ table addresses are set in the FI/FO section 5. Accordingly, the timing signal generating section 29 is initialized.

In this state, when a vertical synchronization signal S1 is inputted, the timing signal generating section 29 is set to a drawing state. Also, the ROM address generating counter 31 and the display buffer section 24 are initialized. If the FI/FO section empty signal S8 is in the disable state, the 2D graphic processor 22 does not operate until a next horizontal synchronization signal S2 is inputted. On the other hand, if the FI/FO section empty signal S8 is in the enable state, when the timing signal generating section 29 outputs an FI/FO section request signal S7 to the FI/FO section 27. The FI/FO section 27 outputs an OBJ table section address signal S6 to the OBJ table section 26 in response to the FI/FO section request signal S7 such that the record of parameters for the figure to be displayed are read out (Steps ST12 to ST14).

Of the read out parameters, the X coordinate origin value P1 and the Y coordinate origin value P2 are supplied to the display buffer section address adder 32 as an X coordinate origin signal S9 and a Y coordinate origin signal S10, respectively. The display figure ROM origin value P3 is supplied to the ROM address adder 30 as a figure ROM address origin signal S11. The form table address origin value P4 is supplied to the ROM address generating counter 31 and the free deformation determining section 28 as a form table address signal S20.

The form table address origin value P4 included in the form table address signal S20 supplied from the OBJ table section 26 is used for determination by the free deformation determining section 28 (Step S15). That is, if the form table address value FA is any value which can not be set as an address value for the form table memory 34, the free deformation determining section 28 determines that the figure data designated by the FI/FO section 27 is not freely deformed, and switches a free deformation enable signal S22 to the disable state. On the other, if the form table address value FA is a value which is set as an address value for the form table memory 34, the free deformation determining section 28 determines that the figure data designated by the FI/FO section 27 is freely deformed, and switches a free deformation enable signal S22 to the enable state.

After the respective parameters of the figure data are outputted from the OBJ table section 26, the timing signal generating section 29 outputs a ROM calculation control signal S21 to the ROM address generating counter 31. The ROM address generating counter 31 receives the ROM calculation control signal S21 as a start signal, and then sequentially generates ROM addresses to outputs a ROM address generating counter output signal S13. At this time, since receiving a free deformation enable signal S22 in the disable state, the selector section 44 passes the ROM address generating counter output signal S13 as it is, and outputs to the ROM address adder 30 as a display buffer section address adding signal S18. The ROM address adder 30 adds the adding signal S18 and the display figure ROM origin value P3 included in a figure ROM address origin signal S11 to generate and output a figure ROM address signal S12 to the figure ROM 23 (Step ST17).

The figure ROM 23 outputs to the display buffer section 24 a display buffer section data signal S15 having a desired figure data, based on the figure ROM address signal S12. At this time, the figure ROM address signal S12 includes ROM addresses for pixels of the desired figure data.

At the same time, the display buffer section address adder 32 adds the ROM address generating counter output signal S13 and each of the X coordinate origin value P1 included in an X coordinate origin signal S9 supplied from the OBJ table section 26 and the Y coordinate origin value P2 included in a Y coordinate origin signal S10, to generate and output a display buffer section address signal S17 to the display buffer section 14. Thus, the display position of the desired figure on the screen of a display unit (not shown) is determined. Also, the display buffer enable signal S16 supplied from the ROM address generating counter 31 is switched from the disable state to the enable state, while the display buffer section data signal S15 and the display buffer section address signal S17 are outputted. After all the data of a single figure for a horizontal line are completely stored in the display buffer section 24, the display buffer enable signal S16 is switched to the disable state. Thus, the operation for the horizontal line is ended (Step ST18). Then, the above operation is repeated for all the horizontal lines so that the entire figure data is stored in the display buffer section 24. then, the entire figure data stored in the display buffer section 24 is outputted to a display unit (not shown). Accordingly, the figure data is displayed on the screen.

On the other hand, when it is determined by the free deformation determining section 28 that the form table address value FA is a value which can be set as the address value for the form table memory 34, the free deformation enable signal S22 is outputted from the free deformation determining section 28. At this time, the free deformation enable signal S22 is switched to the enable state so as to set the free deformation figure. Also, the ROM address generating counter 31 is set to the state in which the free deformation operation is possible.

The timing signal generating section 29 outputs the ROM calculation control signal S21 to the ROM address generating counter 31, after the respective parameters of the figure data are outputted from the OBJ table section 26. The ROM address generating counter 31 generates and outputs the ROM address generating counter output signal S13 to the selector section 44, the form table memory 34 and the timing signal generating section 29 based on the form table address origin value P4 included in the form table address signal S20 in response to the ROM calculation control signal S21 as the start signal and the free deformation enable signal S22. Thus, a period for which the figure is stored in the display buffer section 24 is set in the timing signal generating section 29.

The form table memory 34 outputs the data elements of the form table which is designated by the ROM address generating counter output signal S13 as a form table data signal S14 in response to the ROM address generating counter output signal S13. Thus, the ROM address generating counter output signal S13 is manipulated as the form table address value FA, the table data of the form table data value FD is outputted. As described above, the data elements of the form table are the addresses of the figure data stored in the figure ROM 23. The form table data signal S14 is supplied to the ROM address generating counter 31, the selector 44 and the timing signal generating section 29.

The selector section 44 receives the free deformation enable signal S22 in the enable state, and then is set to a state in which the form table data value FD included in the form table data signal S14 can be outputted as the display buffer section address adding signal S18. The ROM address adder 30 adds the display buffer section address adding signal S18 and the display figure ROM origin value P3 included in the figure ROM address origin signal S21 supplied from the OBJ table section 26, and then generates and outputs the figure ROM address signal S12 to the figure ROM 23 (Step ST16).

The figure ROM 23 outputs the display buffer section data signal S15 to the display buffer section 24 in accordance with the figure ROM address signal S12. At the same time, the display buffer section address adder 32 adds the ROM address generating counter output signal S13 and each of the X coordinate origin value P1 included in the X coordinate origin signal S9 supplied from the OBJ table section 26 and the Y coordinate origin value P2 included in the Y coordinate origin signal S10, and then generates and outputs the display buffer section address signal S17 to the display buffer section 14. Moreover, while the display buffer section data signal S15 and the display buffer section address signal S17 are outputted, the display buffer enable signal S16 outputted from the ROM address generating counter 31 is switched from the disable state to the enable state. It should be noted that if a non-display flag is set in the form table data value FD when the figure is displayed, the display buffer enable signal S16 supplied from the ROM address generating counter 31 is switched to the disable state, and non-display information is not stored in the display buffer section 24.

The display buffer enable signal S16 is switched from the enable state to the disable state, at a time point when the deformed figure data for the horizontal line is stored in the display buffer section 24. Then, the operation for the horizontal line is ended (Step ST18).

The timing signal generating section 29 determines the state of the FI/FO section empty signal S8, and repeats the above mentioned operation until this section empty signal S8 is switched to the disable state. Therefore, the figure data is stored in the display buffer section 14. After all the figures to be displayed are stored in the display buffer section 24, all the figure data in the display buffer section 24 are outputted to the display unit. The above mentioned operation is repeated so that the figure data are displayed on the screen of the display unit.

Next, a display setting procedure of a display figure example 1 (sp1) and a display figure example 2 (sp2) to be displayed on a screen when a display screen example 1 (SC1), a display screen example 2 (SC2), a display screen example 3 (SC3) and a display screen example 4 (SC4) are deformed in this order will be described below using specific examples.

Figure 7:
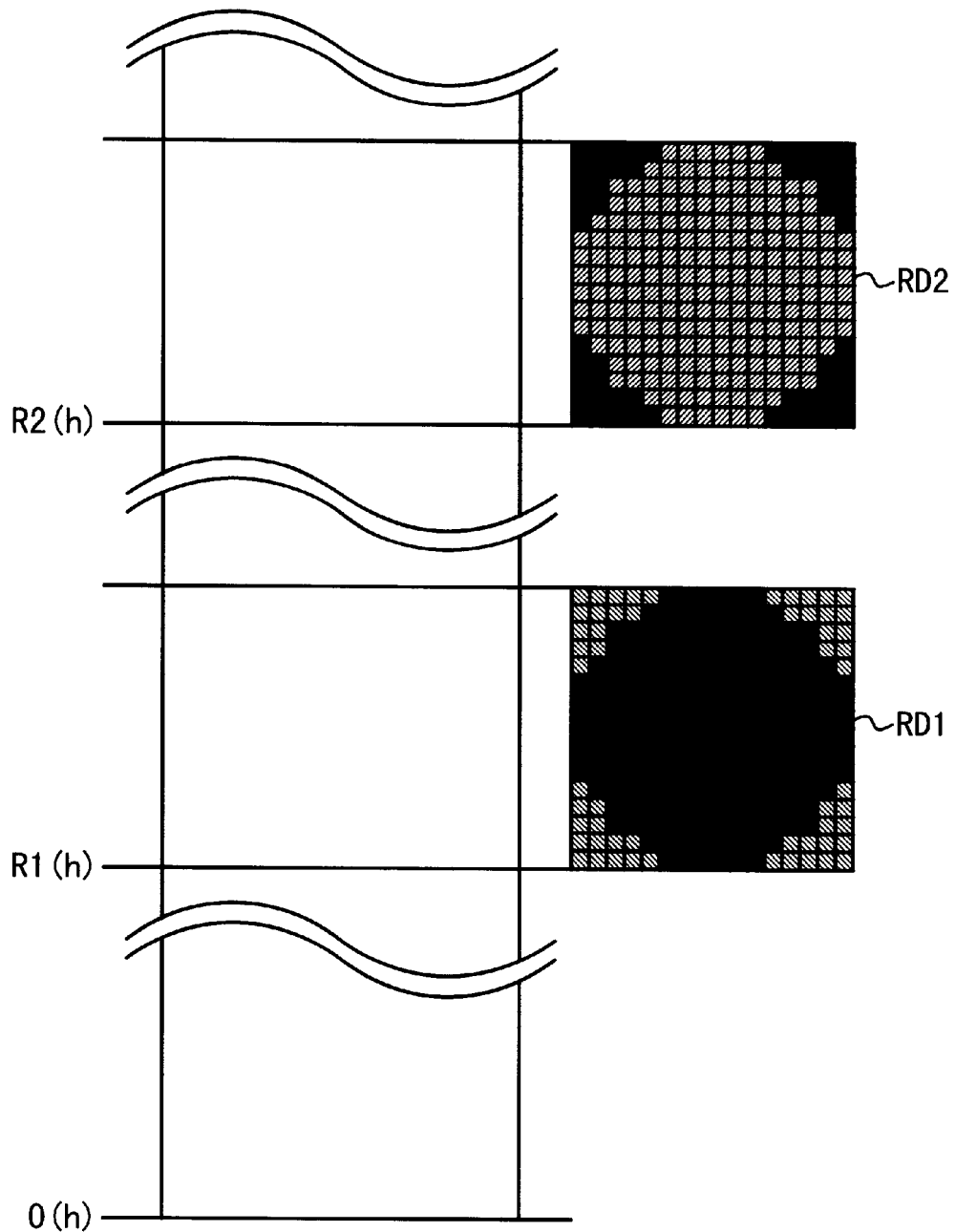
FIG. 7 is a schematic diagram showing the content of a figure ROM in the two-dimensional image processing apparatus in the first embodiment.
Figure 8:
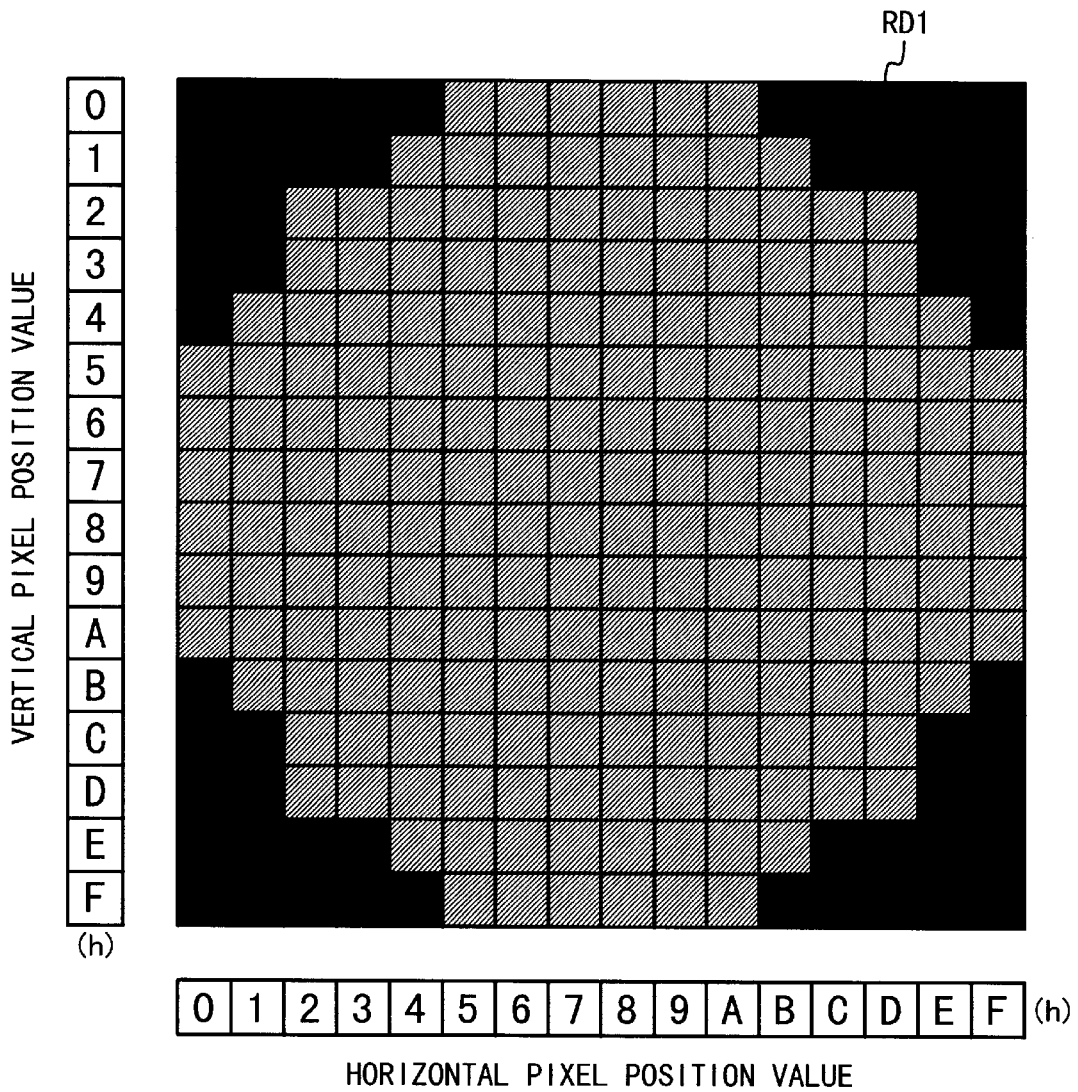
FIG. 8 is a schematic diagram showing a form table in the two-dimensional image processing apparatus in the first embodiment.

At first, the form table will be schematically described. FIG. 7 is a schematic diagram showing the figure ROM mapping according to the present invention. FIG. 8 is a schematic diagram showing the form table. RD1 is a figure data having 16×16 pixels mapped into the figure ROM 23. A vertical PIXEL position value indicates the number of pixel positions counted from the uppermost pixel position to a concerned pixel position in a vertical direction. A horizontal PIXEL position value indicates the number of pixel positions counted from the most left pixel position to the concerned pixel position in a horizontal direction.

Now, the two-dimensional image processing apparatus in the first embodiment will be described with reference to FIGS. 9A to 9D, 10A to 10D, and 11A to 11D, and FIGS. 3A to 3D described above.

TABLE 1

Form Table Values of FT0

Header Data

| 10(h) | 10(h) |
|---|---|

Table Data

| 000(h) | 001(h) | 002(h) | 003(h) | 004(h) | 005(h) | 006(h) | 007(h) | 008(h) | 009(h) | 00A(h) | 00B(h) | 00C(h) | 00D(h) | 00E(h) | 00F(h) |
|---|---|---|---|---|---|---|---|---|---|---|---|---|---|---|---|
| 010(h) | 011(h) | 012(h) | 013(h) | 014(h) | 015(h) | 016(h) | 017(h) | 018(h) | 019(h) | 01A(h) | 01B(h) | 01C(h) | 01D(h) | 01E(h) | 01F(h) |
| 020(h) | 021(h) | 022(h) | 023(h) | 024(h) | 025(h) | 026(h) | 027(h) | 028(h) | 029(h) | 02A(h) | 02B(h) | 02C(h) | 02D(h) | 02E(h) | 02F(h) |
| 030(h) | 031(h) | 032(h) | 033(h) | 034(h) | 035(h) | 036(h) | 037(h) | 038(h) | 039(h) | 03A(h) | 03B(h) | 03C(h) | 03D(h) | 03E(h) | 03F(h) |
| 040(h) | 041(h) | 042(h) | 043(h) | 044(h) | 045(h) | 046(h) | 047(h) | 048(h) | 049(h) | 04A(h) | 04B(h) | 04C(h) | 04D(h) | 04E(h) | 04F(h) |

TABLE 1-continued

Form Table Values of FT0

Header Data

| 10(h) | | | | | | | | 10(h) | | | | | | | |
|---|---|---|---|---|---|---|---|---|---|---|---|---|---|---|---|
| 050(h) | 051(h) | 052(h) | 053(h) | 054(h) | 055(h) | 056(h) | 057(h) | 058(h) | 059(h) | 05A(h) | 05B(h) | 05C(h) | 05D(h) | 05E(h) | 05F(h) |
| 060(h) | 061(h) | 062(h) | 063(h) | 064(h) | 065(h) | 066(h) | 067(h) | 068(h) | 069(h) | 06A(h) | 06B(h) | 06C(h) | 06D(h) | 06E(h) | 06F(h) |
| 070(h) | 071(h) | 072(h) | 073(h) | 074(h) | 075(h) | 076(h) | 077(h) | 078(h) | 079(h) | 07A(h) | 07B(h) | 07C(h) | 07D(h) | 07E(h) | 07F(h) |
| 080(h) | 081(h) | 082(h) | 083(h) | 084(h) | 085(h) | 086(h) | 087(h) | 088(h) | 089(h) | 08A(h) | 08B(h) | 08C(h) | 08D(h) | 08E(h) | 08F(h) |
| 090(h) | 091(h) | 092(h) | 093(h) | 094(h) | 095(h) | 096(h) | 097(h) | 098(h) | 099(h) | 09A(h) | 09B(h) | 09C(h) | 09D(h) | 09E(h) | 09F(h) |
| 0A0(h) | 0A1(h) | 0A2(h) | 0A3(h) | 0A4(h) | 0A5(h) | 0A6(h) | 0A7(h) | 0A8(h) | 0A9(h) | 0AA(h) | 0AB(h) | 0AC(h) | 0AD(h) | 0AE(h) | 0AF(h) |
| 0B0(h) | 0B1(h) | 0B2(h) | 0B3(h) | 0B4(h) | 0B5(h) | 0B6(h) | 0B7(h) | 0B8(h) | 0B9(h) | 0BA(h) | 0BB(h) | 0BC(h) | 0BD(h) | 0BE(h) | 0BF(h) |
| 0C0(h) | 0C1(h) | 0C2(h) | 0C3(h) | 0C4(h) | 0C5(h) | 0C6(h) | 0C7(h) | 0C8(h) | 0C9(h) | 0CA(h) | 0CB(h) | 0CC(h) | 0CD(h) | 0CE(h) | 0CF(h) |
| 0D0(h) | 0D1(h) | 0D2(h) | 0D3(h) | 0D4(h) | 0D5(h) | 0D6(h) | 0D7(h) | 0D8(h) | 0D9(h) | 0DA(h) | 0DB(h) | 0DC(h) | 0DD(h) | 0DE(h) | 0DF(h) |
| 0E0(h) | 0E1(h) | 0E2(h) | 0E3(h) | 0E4(h) | 0E5(h) | 0E6(h) | 0E7(h) | 0E8(h) | 0E9(h) | 0EA(h) | 0EB(h) | 0EC(h) | 0ED(h) | 0EE(h) | 0EF(h) |
| 0F0(h) | 0F1(h) | 0F2(h) | 0F3(h) | 0F4(h) | 0F5(h) | 0F6(h) | 0F7(h) | 0F8(h) | 0F9(h) | 0FA(h) | 0FB(h) | 0FC(h) | 0FD(h) | 0FE(h) | 0FF(h) |

TABLE 2

Form Table Values of Value of FT1

Header Data

| 10(h) | | | | | | | | 10(h) | | | | | | | |
|---|---|---|---|---|---|---|---|---|---|---|---|---|---|---|---|

Table Data

| 000(h) | 001(h) | 002(h) | 003(h) | 004(h) | 005(h) | 006(h) | 007(h) | 008(h) | 009(h) | 00A(h) | 00B(h) | 00C(h) | 00D(h) | 00E(h) | 00F(h) |
|---|---|---|---|---|---|---|---|---|---|---|---|---|---|---|---|
| 010(h) | 011(h) | 012(h) | 013(h) | 014(h) | 015(h) | 016(h) | 017(h) | 018(h) | 019(h) | 01A(h) | 01B(h) | 01C(h) | 01D(h) | 01E(h) | 01F(h) |
| 1XX(h) | 020(h) | 021(h) | 022(h) | 023(h) | 024(h) | 025(h) | 026(h) | 029(h) | 02A(h) | 02B(h) | 02C(h) | 02D(h) | 02E(h) | 02F(h) | 1XX(h) |
| 1XX(h) | 030(h) | 031(h) | 032(h) | 033(h) | 034(h) | 035(h) | 036(h) | 039(h) | 03A(h) | 03B(h) | 03C(h) | 03D(h) | 03E(h) | 03F(h) | 1XX(h) |
| 1XX(h) | 040(h) | 041(h) | 042(h) | 043(h) | 044(h) | 045(h) | 046(h) | 049(h) | 04A(h) | 04B(h) | 04C(h) | 04D(h) | 04E(h) | 04F(h) | 1XX(h) |
| 1XX(h) | 050(h) | 051(h) | 052(h) | 053(h) | 054(h) | 055(h) | 056(h) | 059(h) | 05A(h) | 05B(h) | 05C(h) | 05D(h) | 05E(h) | 05F(h) | 1XX(h) |
| 1XX(h) | 060(h) | 061(h) | 062(h) | 063(h) | 064(h) | 065(h) | 066(h) | 069(h) | 06A(h) | 06B(h) | 06C(h) | 06D(h) | 06E(h) | 06F(h) | 1XX(h) |
| 1XX(h) | 070(h) | 071(h) | 072(h) | 073(h) | 074(h) | 075(h) | 076(h) | 079(h) | 07A(h) | 07B(h) | 07C(h) | 07D(h) | 07E(h) | 07F(h) | 1XX(h) |
| 1XX(h) | 080(h) | 081(h) | 082(h) | 083(h) | 084(h) | 085(h) | 086(h) | 089(h) | 08A(h) | 08B(h) | 08C(h) | 08D(h) | 08E(h) | 08F(h) | 1XX(h) |
| 1XX(h) | 090(h) | 091(h) | 092(h) | 093(h) | 094(h) | 095(h) | 096(h) | 099(h) | 09A(h) | 09B(h) | 09C(h) | 09D(h) | 09E(h) | 09F(h) | 1XX(h) |
| 1XX(h) | 0A0(h) | 0A1(h) | 0A2(h) | 0A3(h) | 0A4(h) | 0A5(h) | 0A6(h) | 0A9(h) | 0AA(h) | 0AB(h) | 0AC(h) | 0AD(h) | 0AE(h) | 0AF(h) | 1XX(h) |
| 1XX(h) | 0B0(h) | 0B1(h) | 0B2(h) | 0B3(h) | 0B4(h) | 0B5(h) | 0B6(h) | 0B9(h) | 0BA(h) | 0BB(h) | 0BC(h) | 0BD(h) | 0BE(h) | 0BF(h) | 1XX(h) |
| 1XX(h) | 0C0(h) | 0C1(h) | 0C2(h) | 0C3(h) | 0C4(h) | 0C5(h) | 0C6(h) | 0C9(h) | 0CA(h) | 0CB(h) | 0CC(h) | 0CD(h) | 0CE(h) | 0CF(h) | 1XX(h) |
| 1XX(h) | 0D0(h) | 0D1(h) | 0D2(h) | 0D3(h) | 0D4(h) | 0D5(h) | 0D6(h) | 0D9(h) | 0DA(h) | 0DB(h) | 0DC(h) | 0DD(h) | 0DE(h) | 0DF(h) | 1XX(h) |
| 0E0(h) | 0E1(h) | 0E2(h) | 0E3(h) | 0E4(h) | 0E5(h) | 0E6(h) | 0E7(h) | 0E8(h) | 0E9(h) | 0EA(h) | 0EB(h) | 0EC(h) | 0ED(h) | 0EE(h) | 0EF(h) |
| 0F0(h) | 0F1(h) | 0F2(h) | 0F3(h) | 0F4(h) | 0F5(h) | 0F6(h) | 0F7(h) | 0FB(h) | 0F9(h) | 0EF(h) | 0FB(h) | 0FC(h) | 0FD(h) | 0FE(h) | 0FF(h) |

TABLE 3

Form Table Values of FT2

Header Data

| 10(h) | | | | | | | | 10(h) | | | | | | | |
|---|---|---|---|---|---|---|---|---|---|---|---|---|---|---|---|

Table Data

| 000(h) | 001(h) | 002(h) | 003(h) | 004(h) | 005(h) | 006(h) | 007(h) | 008(h) | 009(h) | 00A(h) | 00B(h) | 00C(h) | 00D(h) | 00E(h) | 00F(h) |
|---|---|---|---|---|---|---|---|---|---|---|---|---|---|---|---|
| 010(h) | 011(h) | 012(h) | 013(h) | 014(h) | 015(h) | 016(h) | 017(h) | 018(h) | 019(h) | 01A(h) | 01B(h) | 01C(h) | 01D(h) | 01E(h) | 01F(h) |
| 1XX(h) | 020(h) | 021(h) | 022(h) | 023(h) | 024(h) | 025(h) | 026(h) | 029(h) | 02A(h) | 02B(h) | 02C(h) | 02D(h) | 02E(h) | 02F(h) | 1XX(h) |
| 1XX(h) | 030(h) | 031(h) | 032(h) | 033(h) | 034(h) | 035(h) | 036(h) | 039(h) | 03A(h) | 03B(h) | 03C(h) | 03D(h) | 03E(h) | 03F(h) | 1XX(h) |
| 1XX(h) | 1XX(h) | 040(h) | 041(h) | 042(h) | 043(h) | 044(h) | 045(h) | 04A(h) | 04B(h) | 04C(h) | 04D(h) | 04E(h) | 04F(h) | 1XX(h) | 1XX(h) |
| 1XX(h) | 1XX(h) | 050(h) | 051(h) | 052(h) | 053(h) | 054(h) | 055(h) | 05A(h) | 05B(h) | 05C(h) | 05D(h) | 05E(h) | 05F(h) | 1XX(h) | 1XX(h) |
| 1XX(h) | 1XX(h) | 060(h) | 061(h) | 062(h) | 063(h) | 064(h) | 065(h) | 06A(h) | 06B(h) | 06C(h) | 06D(h) | 06E(h) | 06F(h) | 1XX(h) | 1XX(h) |
| 1XX(h) | 1XX(h) | 070(h) | 071(h) | 072(h) | 073(h) | 074(h) | 075(h) | 07A(h) | 07B(h) | 07C(h) | 07D(h) | 07E(h) | 07F(h) | 1XX(h) | 1XX(h) |
| 1XX(h) | 1XX(h) | 080(h) | 081(h) | 082(h) | 083(h) | 084(h) | 085(h) | 08A(h) | 08B(h) | 08C(h) | 08D(h) | 08E(h) | 08F(h) | 1XX(h) | 1XX(h) |
| 1XX(h) | 1XX(h) | 090(h) | 091(h) | 092(h) | 093(h) | 094(h) | 095(h) | 09A(h) | 09B(h) | 09C(h) | 09D(h) | 09E(h) | 09F(h) | 1XX(h) | 1XX(h) |
| 1XX(h) | 1XX(h) | 0A0(h) | 0A1(h) | 0A2(h) | 0A3(h) | 0A4(h) | 0A5(h) | 0AA(h) | 0AB(h) | 0AC(h) | 0AD(h) | 0AE(h) | 0AF(h) | 1XX(h) | 1XX(h) |
| 1XX(h) | 1XX(h) | 0B0(h) | 0B1(h) | 0B2(h) | 0B3(h) | 0B4(h) | 0B5(h) | 0BA(h) | 0BB(h) | 0BC(h) | 0BD(h) | 0BE(h) | 0BF(h) | 1XX(h) | 1XX(h) |
| 1XX(h) | 0C0(h) | 0C1(h) | 0C2(h) | 0C3(h) | 0C4(h) | 0C5(h) | 0C6(h) | 0C9(h) | 0CA(h) | 0CB(h) | 0CC(h) | 0CD(h) | 0CE(h) | 0CF(h) | 1XX(h) |
| 1XX(h) | 0D0(h) | 0D1(h) | 0D2(h) | 0D3(h) | 0D4(h) | 0D5(h) | 0D6(h) | 0D9(h) | 0DA(h) | 0DB(h) | 0DC(h) | 0DD(h) | 0DE(h) | 0DF(h) | 1XX(h) |
| 0E0(h) | 0E1(h) | 0E2(h) | 0E3(h) | 0E4(h) | 0E5(h) | 0E6(h) | 0E7(h) | 0E8(h) | 0E9(h) | 0EA(h) | 0EB(h) | 0EC(h) | 0ED(h) | 0EE(h) | 0EF(h) |
| 0F0(h) | 0F1(h) | 0F2(h) | 0F3(h) | 0F4(h) | 0F5(h) | 0F6(h) | 0F7(h) | 0F8(h) | 0F9(h) | 0FA(h) | 0FB(h) | 0FC(h) | 0FD(h) | 0FE(h) | 0FF(h) |

TABLE 4

Form Table Values of FT3

Header Data

| 10(h) | | | | | | | | | | | | | | 10(h) | |
|---|---|---|---|---|---|---|---|---|---|---|---|---|---|---|---|

Table Data

| 000(h) | 001(h) | 002(h) | 003(h) | 004(h) | 005(h) | 006(h) | 007(h) | 008(h) | 009(h) | 00A(h) | 00B(h) | 00C(h) | 00D(h) | 00E(h) | 00F(h) |
|---|---|---|---|---|---|---|---|---|---|---|---|---|---|---|---|
| 010(h) | 011(h) | 012(h) | 013(h) | 014(h) | 015(h) | 016(h) | 017(h) | 018(h) | 019(h) | 01A(h) | 01B(h) | 01C(h) | 01D(h) | 01E(h) | 01F(h) |
| 1XX(h) | 020(h) | 021(h) | 022(h) | 023(h) | 024(h) | 025(h) | 026(h) | 029(h) | 02A(h) | 02B(h) | 02C(h) | 02D(h) | 02E(h) | 02F(h) | 1XX(h) |
| 1XX(h) | 030(h) | 031(h) | 032(h) | 033(h) | 034(h) | 035(h) | 036(h) | 039(h) | 03A(h) | 03B(h) | 03C(h) | 03D(h) | 03E(h) | 03F(h) | 1XX(h) |
| 1XX(h) | 1XX(h) | 040(h) | 041(h) | 042(h) | 043(h) | 044(h) | 045(h) | 04A(h) | 04B(h) | 04C(h) | 04D(h) | 04E(h) | 04F(h) | 1XX(h) | 1XX(h) |
| 1XX(h) | 1XX(h) | 050(h) | 051(h) | 052(h) | 053(h) | 054(h) | 055(h) | 05A(h) | 05B(h) | 05C(h) | 05D(h) | 05E(h) | 05F(h) | 1XX(h) | 1XX(h) |
| 1XX(h) | 1XX(h) | 060(h) | 061(h) | 062(h) | 063(h) | 064(h) | 065(h) | 06A(h) | 06B(h) | 06C(h) | 06D(h) | 06E(h) | 06F(h) | 1XX(h) | 1XX(h) |
| 1XX(h) | 1XX(h) | 1XX(h) | 070(h) | 071(h) | 072(h) | 073(h) | 074(h) | 07B(h) | 07C(h) | 07D(h) | 07E(h) | 07F(h) | 1XX(h) | 1XX(h) | 1XX(h) |
| 1XX(h) | 1XX(h) | 1XX(h) | 080(h) | 081(h) | 082(h) | 083(h) | 084(h) | 08B(h) | 08C(h) | 08D(h) | 08E(h) | 08F(h) | 1XX(h) | 1XX(h) | 1XX(h) |
| 1XX(h) | 1XX(h) | 090(h) | 091(h) | 092(h) | 093(h) | 094(h) | 095(h) | 09A(h) | 09B(h) | 09C(h) | 09D(h) | 09E(h) | 09F(h) | 1XX(h) | 1XX(h) |
| 1XX(h) | 1XX(h) | 0A0(h) | 0A1(h) | 0A2(h) | 0A3(h) | 0A4(h) | 0A5(h) | 0AA(h) | 0AB(h) | 0AC(h) | 0AD(h) | 0AE(h) | 0AF(h) | 1XX(h) | 1XX(h) |
| 1XX(h) | 1XX(h) | 0B0(h) | 0B1(h) | 0B2(h) | 0B3(h) | 0B4(h) | 0B5(h) | 0BA(h) | 0BB(h) | 0BC(h) | 0BD(h) | 0BE(h) | 0BF(h) | 1XX(h) | 1XX(h) |
| 1XX(h) | 0C0(h) | 0C1(h) | 0C2(h) | 0C3(h) | 0C4(h) | 0C5(h) | 0C6(h) | 0C9(h) | 0CA(h) | 0CB(h) | 0CC(h) | 0CD(h) | 0CE(h) | 0CF(h) | 1XX(h) |
| 1XX(h) | 0D0(h) | 0D1(h) | 0D2(h) | 0D3(h) | 0D4(h) | 0D5(h) | 0D6(h) | 0D9(h) | 0DA(h) | 0DB(h) | 0DC(h) | 0DD(h) | 0DE(h) | 0DF(h) | 1XX(h) |
| 0E0(h) | 0E1(h) | 0E2(h) | 0E3(h) | 0E4(h) | 0E5(h) | 0E6(h) | 0E7(h) | 0E5(h) | 0E9(h) | 0EA(h) | 0EB(h) | 0EC(h) | 0ED(h) | 0EE(h) | 0EF(h) |
| 0F0(h) | 0F1(h) | 0F2(h) | 0F3(h) | 0F4(h) | 0F5(h) | 0F6(h) | 0F7(h) | 0F8(h) | 0F9(h) | 0FA(h) | 0FB(h) | 0FC(h) | 0FD(h) | 0FE(h) | 0FF(h) |

A table 1 shows the form table FT0 for the deformation algorithm of an original figure data (RD1; sp1) stored in the figure ROM 23 corresponding to FIG. 8. The original figure data is not deformed, i.e., the figure data before deformation. The form table is divided into two data parts: header data and table data. The number of vertical PIXEL position values and the number of horizontal PIXEL position values are stored in the header data. The form table FT0 is not used in the first embodiment.

In the form table data, it is considered that pixels which are transparent and not displayed exist in a region to be displayed in order that background and the like are viewed. For this purpose, information indicative of the pixel which is transparent is added to the vertical PIXEL position value or the horizontal PIXEL position value. The position of each pixel is calculated by the following equation:

(Display/Non-Display Information)×(Number of Vertical PIXEL Position Values (h))×(Number of Horizontal PIXEL Position Values (h))+(Vertical PIXEL Position Value (h))×(Number of Horizontal PIXEL Position Values (h))+(Horizontal PIXEL Position Value (h)).

Then, the form table in which these values are listed is stored in the form table memory 34. The values of the form table are used as the addresses of the figure ROM 23 when the figure is displayed. If the free deformation display is carried out, a new form table for the deformed figure is set in the form table memory 34 by the CPU 21.

Figure 9A:
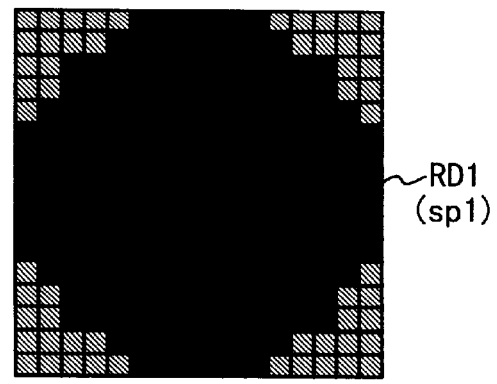
FIGS. 9A to 9D are diagrams showing a form table mapping example 1 in order to display the display screen example 2 (SC2)
Figure 9B:
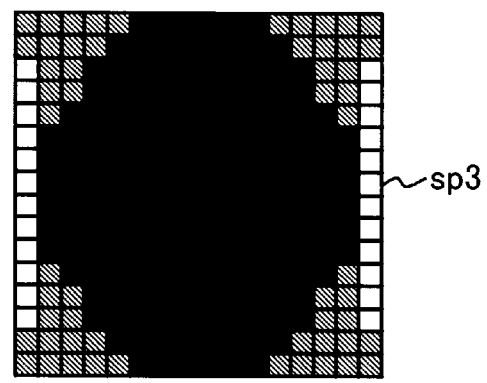
Figure 9C:
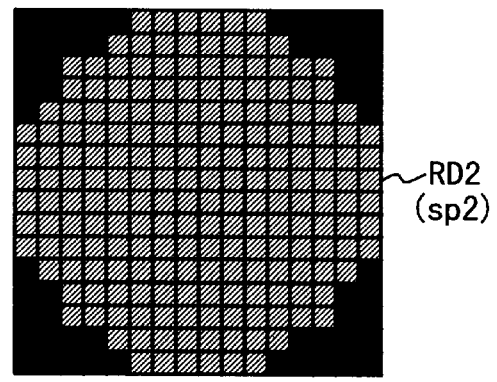
Figure 9D:
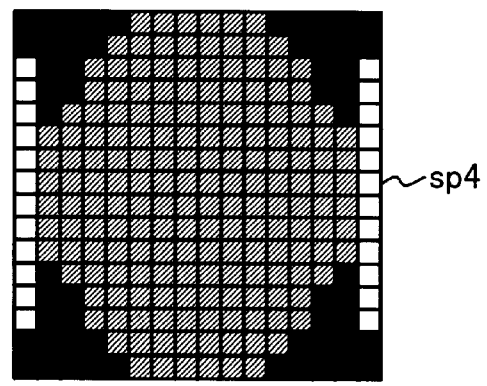
Figure 10A:
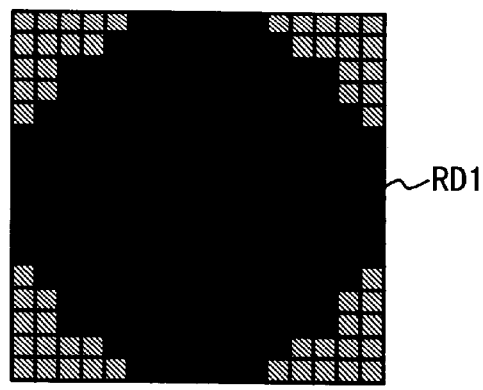
FIGS. 10A to 10D are diagrams showing a form table mapping example 2 in order to display the display screen example 3 (SC3)
Figure 10B:
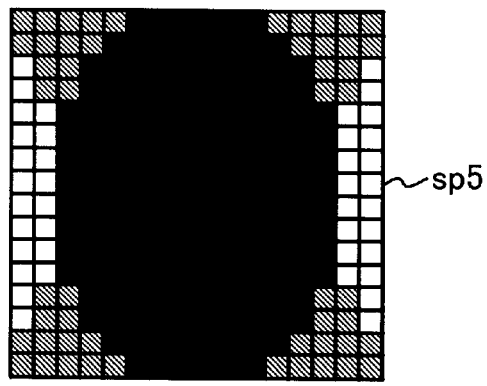
Figure 10C:
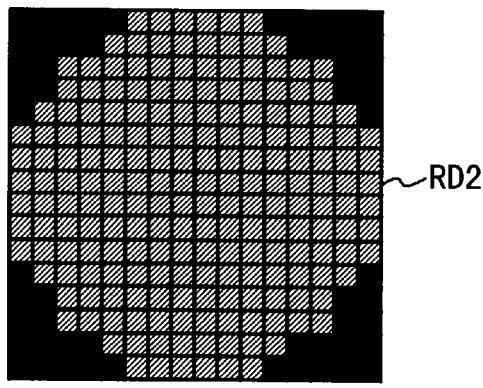
Figure 10D:
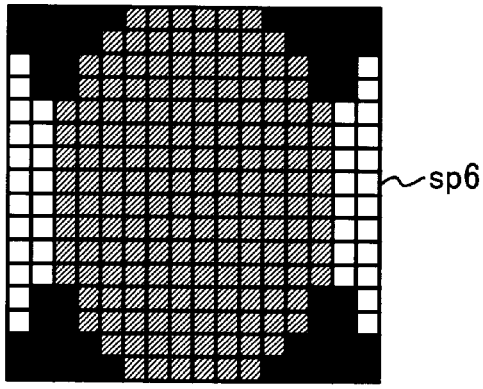
Figure 11A:
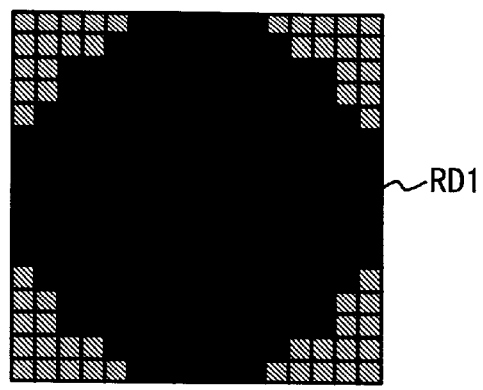
FIGS. 11A to 11D are diagrams showing a form table mapping example 3 in order to display the display screen example 4 (SC4)
Figure 11B:
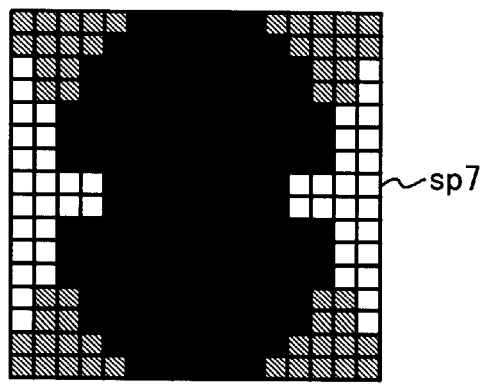
Figure 11C:
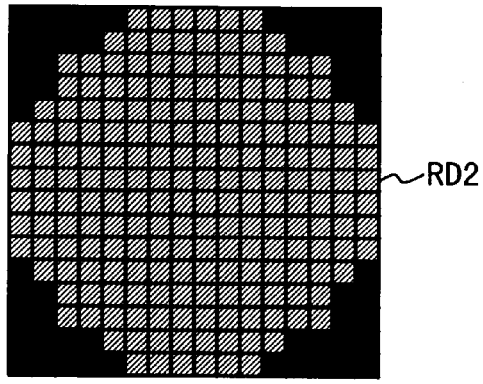
Figure 11D:
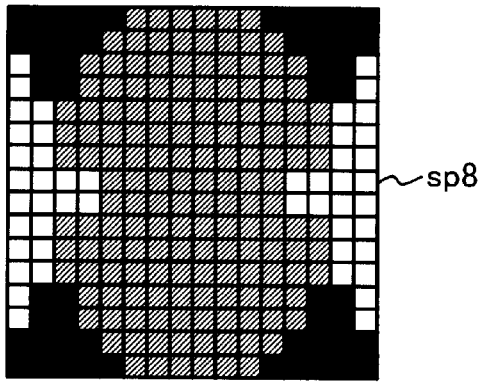

A table 2 shows a form table data value example 1 (FT1) for a figure data (sp3) deformed from the original figure data (sp1) stored in the figure ROM 23, as shown in FIG. 9B.

A table 3 shows a form table data value example 2 (FT2) for a figure data (sp5) deformed from the figure data (sp3).

A table 4 shows a form table data value example 2 (FT3) for a figure data (sp7) deformed from the figure data (sp5).

Figure 1:
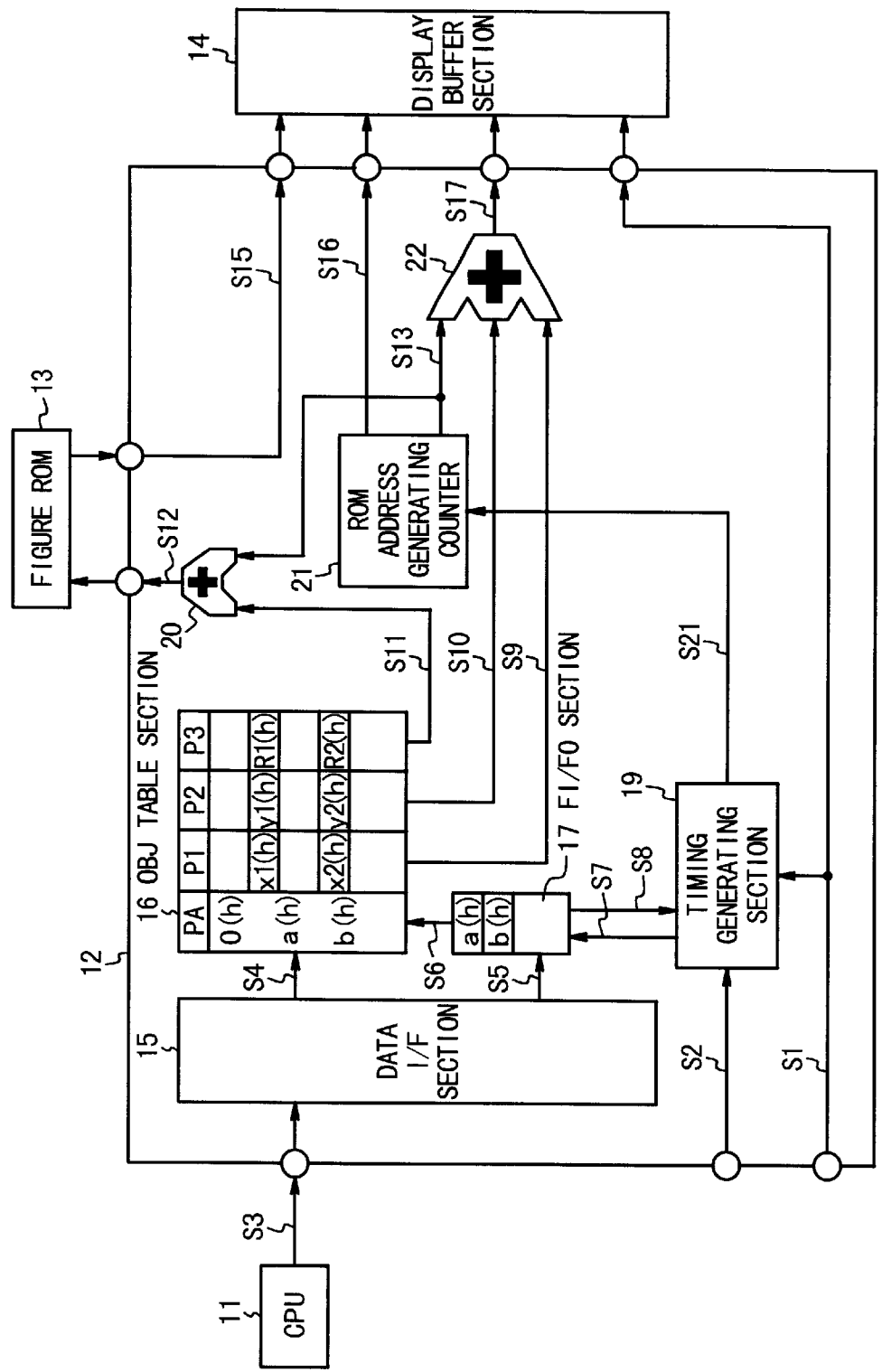
FIG. 1 is a block diagram showing the structure of a conventional two-dimensional image processing apparatus.
Figure 2:
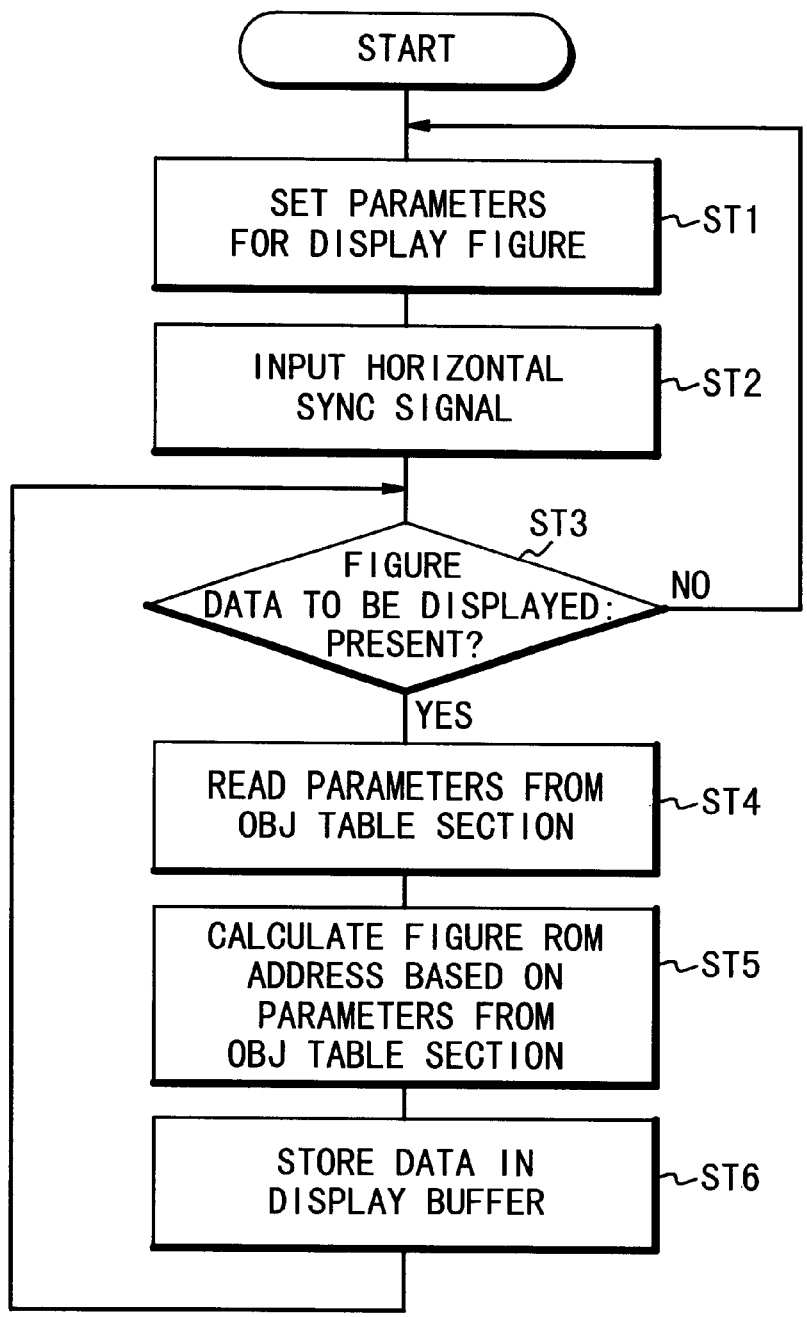
FIG. 2 is a flowchart showing an operation of the conventional two-dimensional image processing apparatus.
Figure 3A:
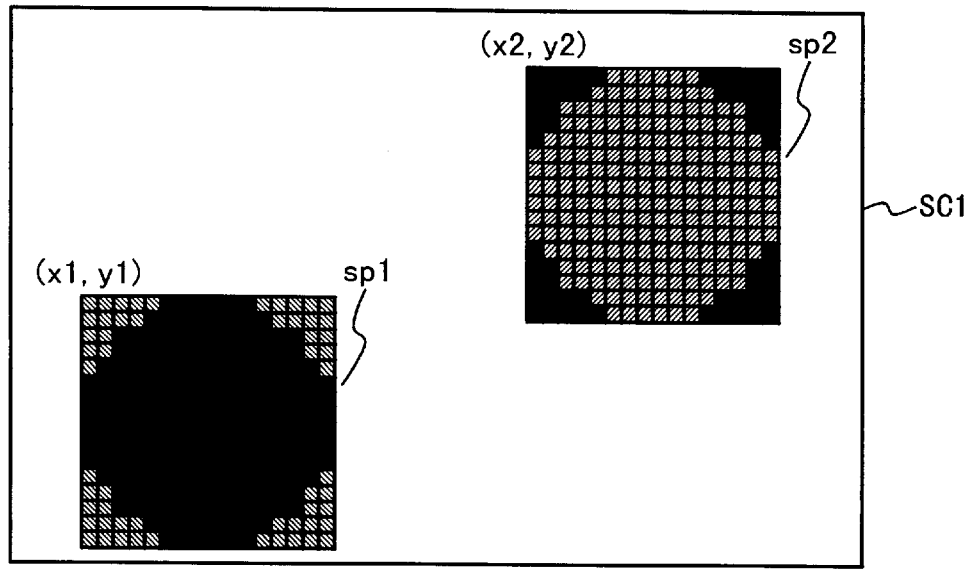
FIGS. 3A to 3D are schematic diagrams showing a display screen example composed of figures, and display screen examples in which the figures are deformed.

At first, in the display screen example 1 (SC1), the figure ROM data 1 (RD1) is mapped into the address R1(h) of the figure ROM 23 as the original data of the display figure example 1 (sp1), by the CPU 21 as shown in FIG. 7. Also, the figure ROM data 2 (RD2) is mapped into R2(h) of the figure ROM 23 as the original data of the display figure example 2 (sp2) by the CPU 21. Then, the CPU 21 sets data FT1(h) to an address F1(h) of the form table memory 34, and data FT2(h) to an address F2(h). Further, the CPU 21 hen sets a record of display parameters for the display figure example 1 (sp1) in an address a(h) of the OBJ table section 26. Specifically, the CPU 21 sets x1(h) as the X coordinate origin value P1, y1(h) as the Y coordinate origin value P2 and the R1(h) as the display figure ROM origin value P3, respectively. Also, the CPU 21 sets a value, which is not included in predetermined form table address values FA, to the form table address origin value P4. Thus, any form table is not used to display the display figure example 1 (sp1). Moreover, the CPU 21 sets a record of display parameters for the display figure example 2 (sp2) in b(h) of the OBJ table section 26. Specifically, the CPU 21 sets x2(h) as the X coordinate origin value P1, y2(h) as the Y coordinate origin value P2 and the R2(h) as the display figure ROM origin value P3, respectively. Also, the CPU 21 sets a value, which is not included in predetermined form table address values FA, to the form table address origin value P4. Then, the CPU 21 sets, to the FI/FO section 27, the addresses a(h) and b(h) that are the addresses of the OBJ table section 26 in which the respective parameters of the display figures are stored. Through the above mentioned operation, the display screen example 1 (SC1) is displayed on the screen, as shown in FIG. 3A.

Figure 3B:
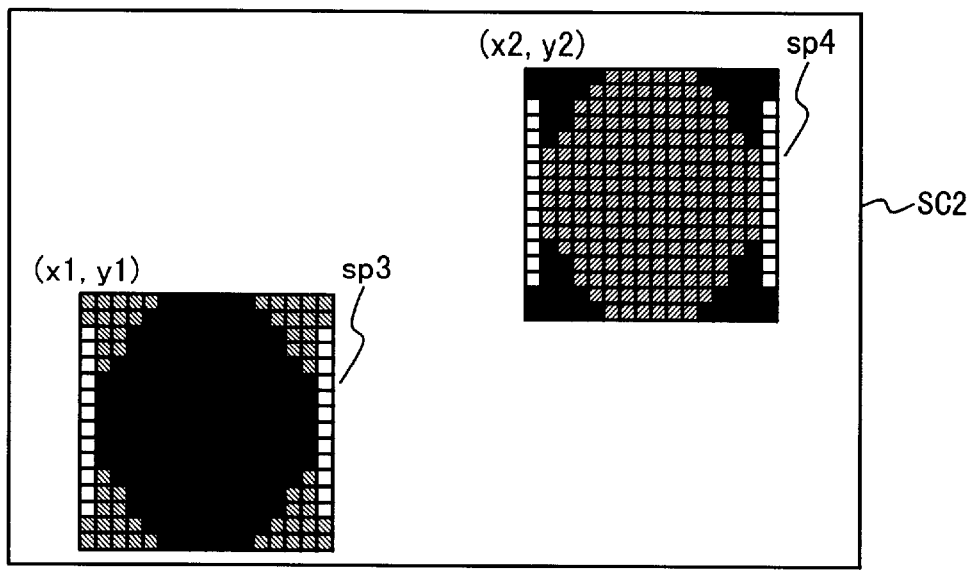

FIGS. 9A to 9D are diagrams showing a display examples for the display screen example 2 (SC2) shown in FIG. 3B. In order to display the display screen example 2 (SC2), the CPU 21 sets F1(h) to the form table address origin value P4 of the OBJ table for the address a(h), and sets the F2(h) to the form table address origin value P4 of the OBJ table for the address b(h). Through the above mentioned operation, the display screen example 2 (SC2) is displayed on the screen, as shown in FIG. 3B, as a result of the free deformation. The table 2 shows the deformation algorithm of FIGS. 9A to 9D. 1XX(h)s on the left and right sides in the form table data of the table 2 are addresses of values (non-display information) corresponding to the left and right white pixel portions of FIGS. 9B and 9D.

FIGS. 10A to 10D are diagrams showing the display screen example 3 (SC3). In order to display the display screen example 3 (SC3), the CPU 21 sets F3(h) to the form table address origin value P4 of the OBJ table for the address a(h), and sets F4(h) to the form table address origin value P4 of the OBJ table for the address b(h). Further, the CPU 21 sets the addresses a(h) and b(h) of the OBJ table section 26 to the FI/FO section 27, respectively. Through the above mentioned operation, the display screen example 3 (SC3) is displayed on the screen, as shown FIG. 3C, as a result of the free deformation of the figures shown in FIG. 3B. The table 3 shows the deformation algorithm in this case. 1XX(h)s on the left and right sides in the table data of the table 3 are addresses of values (non-display information) corresponding to the left and right white void pixel portions of FIGS. 10B and 10D.

Figure 3C:
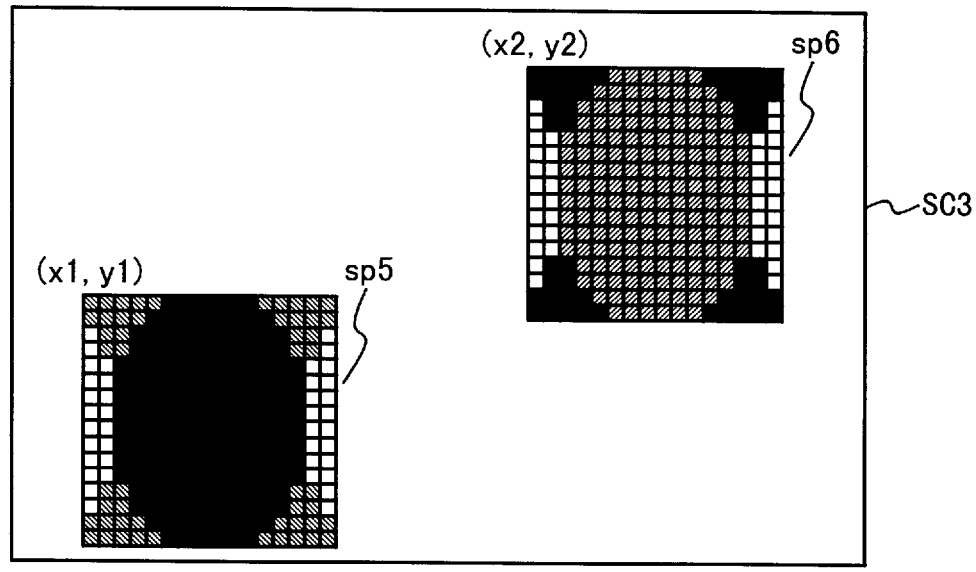
Figure 3D:
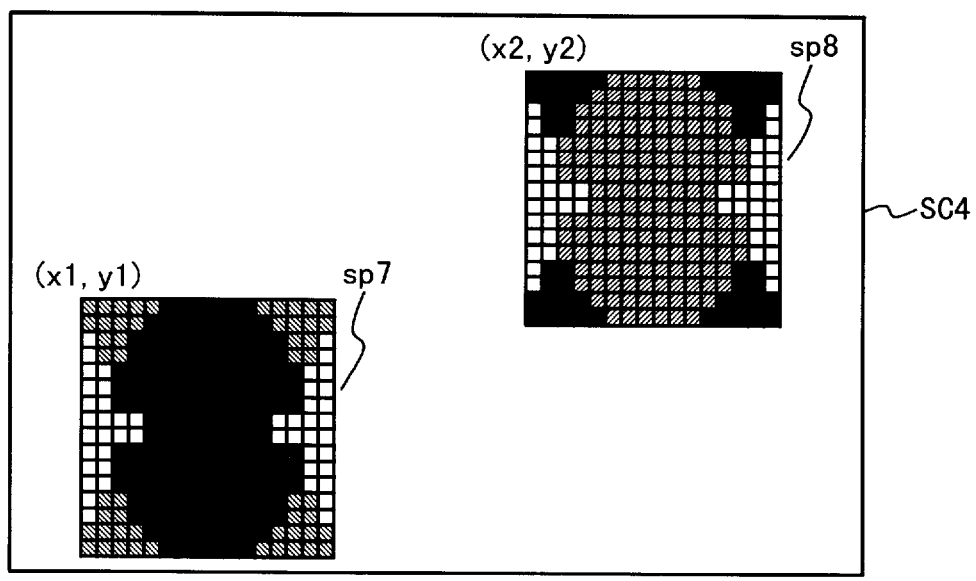
Figure 4:
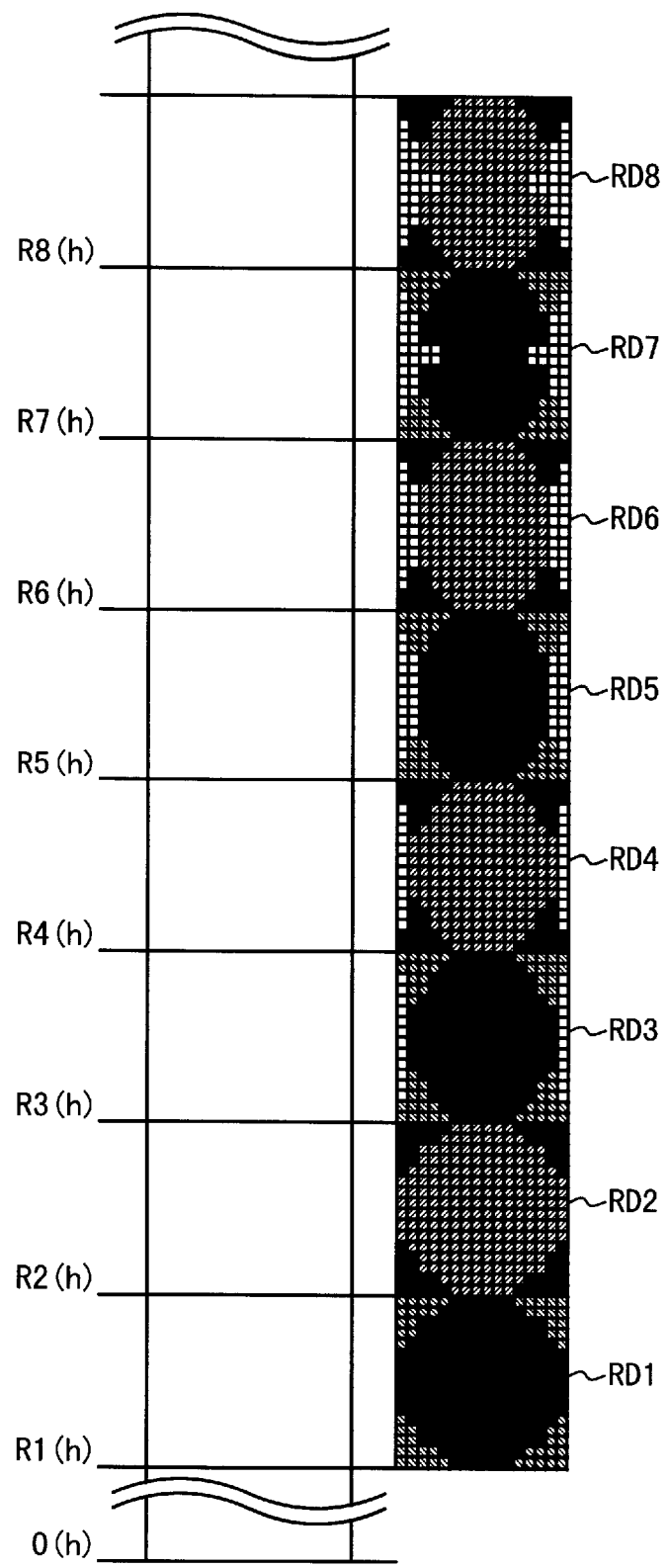
FIG. 4 is a schematic diagram showing the content of a figure ROM when the figure ROM mapping shown in FIGS. 3A to 3D are performed.

FIGS. 11A to 11D are diagrams showing the display screen example 4 (SC4). In order to display the display screen example 4 (SC4), the CPU 21 sets F5(h) to the form table address origin value P4 of the OBJ table section 26 for the address a(h), and sets F6(h) to the form table address origin value P4 of the OBJ table section 26 for the address b(h). Further, the CPU 21 sets the addresses a(h) and b(h) of the OBJ table section 26 to the FI/FO section 27, respectively. Through the above mentioned operation, the display screen example 4 (SC4) is displayed on the screen, as shown in FIG. 3D, as a result of the free deformation of the display screen example 3 (SC3). The table 4 shows the deformation algorithm of FIGS. 11A to 11D. 1XX(h)s on the left and right sides in the table data of the table 4 are addresses of values (non-display information) corresponding to the left and right white void pixel portions of FIGS. 11A and 11D.

As seen from the description, in the two-dimensional image processing apparatus of the present invention, only two figure data are stored in the figure ROM 23. A set of addresses used to read out each of the two figure data is set in the form table memory 34 as one form table by the CPU 21, while 8 figure data are stored in the figure ROM in the conventional example. Thus, the ROM storage capacity can be reduced. Also, the figure can be freely deformed by adding a new form table to the form table memory 34 and by setting the form table address origin value of the new form table in the OBJ table section 26.

Next, the two-dimensional image processing apparatus according to the second embodiment of the present invention will be described below.

Figure 12:
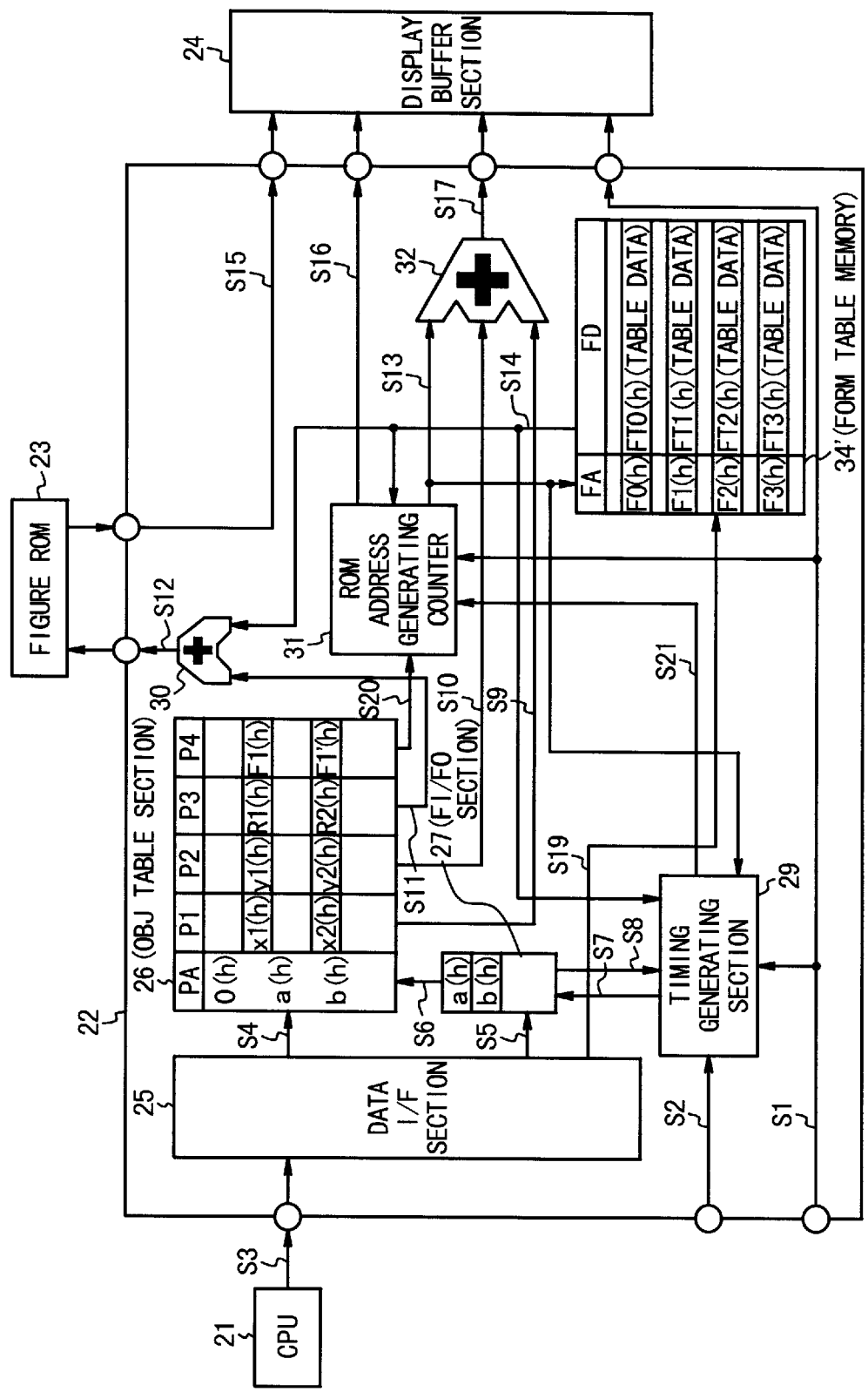
FIG. 12 is a block diagram showing the structure of the two-dimensional image processing apparatus according to a second embodiment of the present invention.
Figure 13:
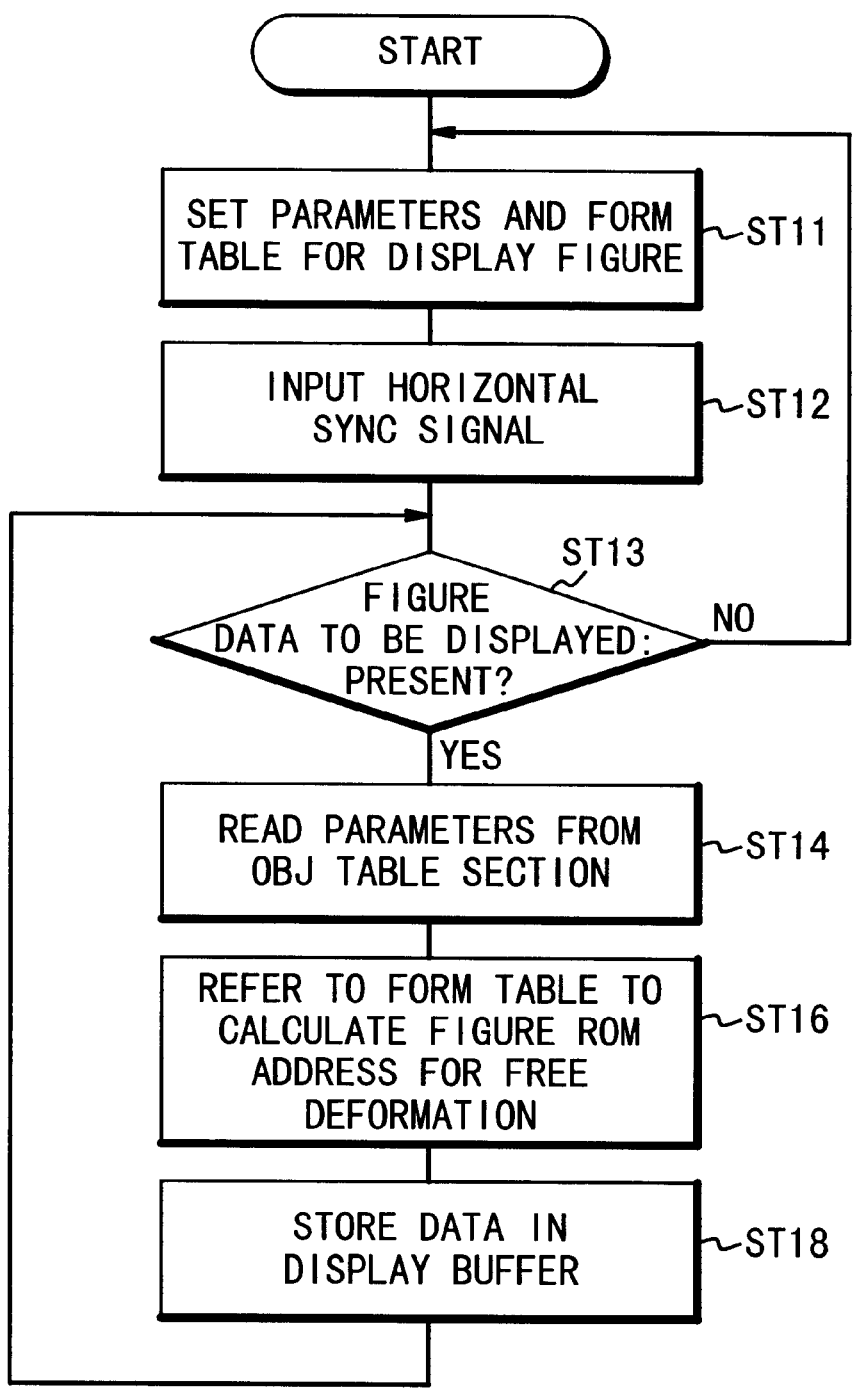
FIG. 13 is a flowchart showing an operation of the two-dimensional image processing apparatus in the second embodiment.

FIG. 12 is a block diagram showing the structure of the two-dimensional image processing apparatus in the second embodiment. FIG. 13 is a flow chart showing an operation in this embodiment. The second embodiment will be described with reference to the figure ROM mapping in FIG. 7, the schematic diagram of the form table shown in FIG. 8, the form table mapping examples in FIGS. 9A to 9D, 10A to 10D and 11A to 11D, and the display screen examples in FIGS. 3A to 3D.

The two-dimensional image processing apparatus in the second embodiment does not include the free deformation determining section 28 of the two-dimensional image processing apparatus in the first embodiment. A function of a form table memory 34' is different from that of the form table memory 34 in the first embodiment in that the form table memory 34' stores the form table for the original figure data. Therefore, the addresses generated by the ROM address generating counter 31 are not supplied to the figure ROM 23. All the figure ROM addresses are supplied from the form table memory 34'. It should be noted that other processes are similar to those of the case shown in FIG. 5.

At first, the form table will be schematically described with reference to FIG. 8. RD1 shows a figure data as an original figure data having 16×16 pixels shown in FIG. 7 and mapped into the figure ROM 23. RD2 shows another figure data as another original figure data having 16×16 pixels shown in FIG. 7. A vertical PIXEL position value indicates the number of pixel positions counted to a concerned pixel position from the uppermost pixel position in a vertical direction. A horizontal PIXEL position value indicates the number of pixel positions counted to the concerned pixel position from the most left pixel position in a horizontal direction.

The above mentioned form table data value example 0 (FT0) shown in the table 1 is stored in the form table memory 34' in the second embodiment. The table 1 shows the form table corresponding to the original figure data (RD1) which is not deformed. The form table is divided into the two data portions: the header data and the table data. The number of vertical PIXEL position values and the number of horizontal PIXEL position values are stored in the header data. In the table data, it is considered that pixels which are transparent and not displayed exist in the region to be displayed in order that background and the like can be viewed. Information corresponding to this pixel which is transparent and not displayed is added to the vertical PIXEL position value or the horizontal PIXEL position value. The position of each pixel is calculated by the following equation:

(Display/Non-Display Information)×(Number of Vertical PIXEL Position Values (h))×(Number of Horizontal PIXEL Position Values (h))+(Vertical PIXEL Position Value (h))×(Number of Horizontal PIXEL Position Values (h))+(Horizontal PIXEL Position Value (h)).

Then, the data in which values obtained from this equation are listed is stored in the form table memory 34'.

When the original figure data is displayed, the table data values of the table 1 are referred to and the figure data RD1 or RD2 is read out from the figure ROM 23. When the free deformation display is carried out, a figure corresponding to the read out figure data is displayed and deformed such that the pixel position at which the read out figure data changed.

Now, an internal operation of the two-dimensional image processing apparatus in the second embodiment will be described. When the CPU 21 sends the CPU data signal S3 to the DATA I/F section 25, the DATA I/F section 25 determines whether the CPU data signal S3 is the OBJ table section setting data signal S4, the FI/FO setting data signal S5 or the form table section setting data signal S15. As a result, when the CPU data signal S3 is the signal to be directed to the OBJ table section 26, the DATA I/F section 25 outputs the OBJ table section setting data signal S4 to the OBJ table section 26, such that the display parameters of the respective figure data are set. At this time, the X coordinate origin value P1, the Y coordinate origin value P2, the display figure ROM origin value P3 and the form table address origin value P4 are given as the display parameters of the OBJ table section 26.

When the CPU data signal S3 is the signal to be directed to the FI/FO section 27, the DATA I/F section 25 outputs the FI/FO setting data signal S5 to the FI/FO section 27 to give the OBJ table section address values PA to the FI/FO section 27 such that the figures to be displayed are specified. Since the figures are specified, the FI/FO section 27 switches the FI/FO section empty signal S8 from the disable state to the enable state.

When the CPU data signal S3 is the signal to be directed to the form table memory 34', the DATA I/F section 25 outputs the form table section setting data signal S19, such that the form table data values FD are set to the form table memory 34'.

When the timing signal generating section 29, the ROM address generating counter 31, and the display buffer section 24 are initialized. Then, the timing signal generating section 29 is initialized to be set to the drawing state in response to the FI/FO section empty signal S8 in the enable state. When the FI/FO section empty signal S8 is in the disable state, the 2D graphic processor 22 does not operate until a next horizontal synchronization signal S2 is inputted (Steps ST11 and ST12). On the other hand, if the FI/FO section empty signal S8 is in the enable state, the timing signal generating section 29 is set in the enable state. The timing signal generating section 29 outputs the FI/FO section request signal S7 to the FI/FO section 27 in response to the horizontal synchronization signal, such that the stored OBJ table section address signal S6 is outputted, so that the respective parameters of the figure to be displayed are read out from the OBJ table section 26 (Steps ST13 and ST14). After the respective parameters of the figure are outputted from the OBJ table section 26, the timing signal generating section 29 outputs the ROM calculation control signal S21 to the ROM address generating counter 31.

The ROM address generating counter 31 receives the form table address origin value P4 included in the form table address signal S20 with the ROM calculation control signal S21 as a start signal, and then generates and outputs the ROM address generating counter output signal S13. The form table memory 34' outputs the form table data signal S14 including the header data value of the form table data value FD, to the ROM address generating counter 31 in response to the ROM address generating counter output signal S13. The ROM address generating counter 31 receives the header data value of the form table data value FD, and then outputs the ROM address generating counter output signal S13 to the display buffer section address adder 32 and the form table memory 34'. Also, the ROM address generating counter 31 outputs the display buffer enable signal S16 to the display buffer section 24. The ROM address generating counter output signal S13 is also outputted to the timing signal generating section 29 such that the period for which the figure data is stored in the display buffer section 24 is set in the timing signal generating section 29.

Also, the form table memory 34' manipulates the supplied ROM address generating counter output signal S13 as the form table address value FA, and then outputs the form table data signal S14 including the form table data of the form table data value FD. The ROM address adder 30 adds the form table data signal S14 and the display figure ROM origin value P3 included in the figure ROM address origin signal S21 supplied from the OBJ table section 26, and then generates and outputs the figure ROM address signal S12 to the figure ROM 23 (Step ST16).

The figure ROM 23 generates and outputs the display buffer section data signal S15 based on the figure ROM address signal S12 to the display buffer section 24. At the same time, the display buffer section address adder 32 adds the ROM address generating counter output signal S13 and each of the X coordinate origin signal S9 including the X coordinate origin value P1 outputted by the OBJ table section 26 and the Y coordinate origin signal S10 including the Y coordinate origin value P2, and then generates and outputs the display buffer section address signal S17 to the display buffer section 24. The display buffer enable signal S16 supplied from the ROM address generating counter 31 is switched from the disable state to the enable state, while the display buffer section data signal S15 and the display buffer section address signal S17 are outputted. It should be noted that when the non-display flag is set for the form table data value FD when the figure is displayed, the display buffer enable signal S16 supplied from the ROM address generating counter 31 is switched to the disable state, and the non-display information is not stored in the display buffer section 24.

At the time point after the entire figure data is completely stored in the display buffer section 24, the display buffer enable signal S16 outputted from the ROM address generating counter 31 is switched from the enable state to the disable state. Thus, the operation is ended (Step ST18). The timing signal generating section 29 determines the state of the FI/FO section empty signal S8. The operation is repeated until this section empty signal S8 is switched to the disable state. Thus, the figure data is stored in the display buffer section 24, as mentioned above. After all the display figure data are stored in the display buffer section 24, all the data in the display buffer section 24 are outputted to a display unit (not shown). By repeating the above mentioned operation, the figure data can be displayed on the screen.

A display setting procedure of the display figure example 1 (sp1) and the display figure example 2 (sp2) to be displayed on the screen when the display screen example 1 (SC1), the display screen example 2 (SC2), the display screen example 3 (SC3) and the display screen example 4 (SC4) are deformed in this order will be described below with reference to FIGS. 7, 8, 9A to 9D, 10A to 19D, 11A to 11D and FIGS. 3A to 3D.

In the display screen example 1 (SC1), the figure ROM data 1 (RD1) is mapped into the R1(h) of the figure ROM 23 as shown in FIG. 7 such that it is displayed as the display figure example 1 (sp1). Also, the figure ROM data 2 (RD2) is mapped into the R2(h) of the figure ROM 23 such that it is displayed as the display figure example 2 (sp2). The CPU 21 sets in advance the form table FT0(h) for the display figure example 1 to the address F0(h) of the form table memory 34', and the form table FT0'(h) (not shown) to the address F0'(h). Also, the CPU 21 sets the form tables FT1(h), FT2(h), FT3(h), FT1'(h), FT2'(h), FT3'(h) to the addresses F1(h), F2(h), F3(h), F1'(h), F2'(h) and F3(h), respectively.

Also, the CPU 21 set the display parameters of the display figure example 1 (sp1) to the address a(h) of the OBJ table section 26. Specifically, the CPU 21 sets the x1(h) as the X coordinate origin value P1, the y1(h) as the Y coordinate origin value P2, the R1(h) as the display figure ROM origin value P3, and F0(h) as the form table address origin value P4, respectively. Also, the CPU 21 sets the display parameters of the display figure example 2 (sp2) to the address b(h) of the OBJ table section 26. Specifically, the CPU 21 sets the x2(h) as the X coordinate origin value P1, the y2(h) as the Y coordinate origin value P2, the R2(h) as the display figure ROM origin value P3, and the F0'(h) as the form table address origin value P4, respectively. Then, the CPU 21 sets to the FI/FO section 27, the addresses a(h) and b(h) of the OBJ table section 26 in which the respective parameters of the display figure are stored. Through the above mentioned operation, the display screen example 1 (SC1) composed of the display figure examples (sp1 and sp2) can be displayed on the screen, as shown in FIG. 3A.

Next, in order to display the display screen example 2 (SC2) when the figures (sp1 and sp2) are deformed, the CPU 21 sets F1(h) to the form table address origin value P4 of the OBJ table section 26 for the address a(h), and the CPU 21 sets F1'(h) to the form table address origin value P4 of the OBJ table section 26 for the address b(h). Further, the CPU 21 sets the addresses a(h) and b(h) of the OBJ table section 26 to the FI/FO section 27, respectively. Through the above mentioned operations, the display screen example 2 (SC2) composed of the display figure examples (sp3 and sp4) can be displayed on the screen, as shown in FIG. 3B, as a result of the free deformation.

Moreover, in order to display the display screen example 3 (SC3) when the figures (sp3 and sp4) are deformed, the CPU 21 sets F2(h) to the form table address origin value P4 of the OBJ table section 26 for the address a(h), and the CPU 21 sets the address F2'(h) to the form table address origin value P4 of the OBJ table section 26 for the address b(h). Also, the CPU 21 sets the addresses a(h) and b(h) of the OBJ table section 26 to the FI/FO section 27, respectively. Through the above mentioned operations, the display screen example 3 (SC3) composed of the display figure examples (sp5 and sp6) can be displayed on the screen, as shown in FIG. 3C, as a result of the free deformation.

In addition, in order to display the display screen example 4 (SC4) when the display screen example 3 (SC3) is deformed, the CPU 21 sets F3(h) to the form table address origin value P4 of the OBJ table section 26 for the address a(h), and the CPU 21 sets the address F3'(h) to the form table address origin value P4 of the OBJ table section 26 for the address b(h). Also, the CPU 21 sets the addresses a(h) and b(h) of the OBJ table section 26 to the FI/FO section 27, respectively. Through the above mentioned operation, the display screen example 4 (SC4) composed of the display figure examples (sp7 and sp8) can be displayed on the screen, as shown in FIG. 3D, as a result of the free deformation.

As described above, in the second embodiment, the circuit structure can be simplified.

Next, the two-dimensional image processing apparatus according to the third embodiment of the present invention will be described below.

Figure 14:
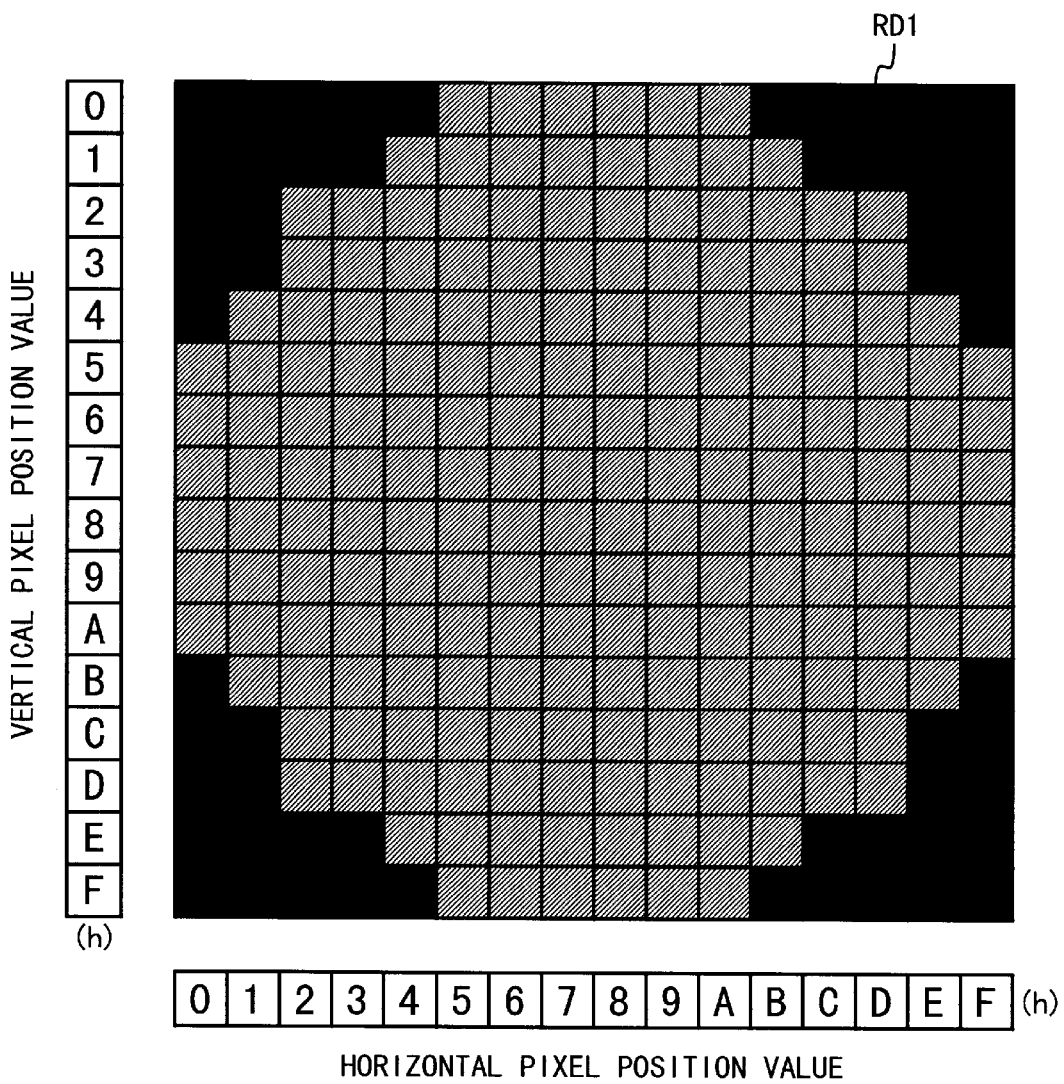
FIG. 14 is a schematic diagram of a form table used in the two-dimensional image processing apparatus according to a third embodiment of the present invention.

The two-dimensional image processing apparatus according to the third embodiment has substantially the same circuit structure as that of the first embodiment or the second embodiment. However, a form table different from those of the first and second embodiments is provided. FIG. 14 is a diagram schematically showing the form table in the third embodiment. A table 5 shows a deformation algorithm of a form table mapping example shown in FIG. 14.

RD1 shown in FIG. 14 shows a form table mapping for a display figure having 16×16 pixels mapped into the figure ROM 23. A vertical PIXEL position value indicates the number of pixel positions counted to a concerned pixel position from the uppermost pixel position in a vertical direction. A horizontal PIXEL position value indicates the number of pixel positions counted to the concerned pixel position from the most left pixel position in a horizontal direction.

The form table data value example 0 (FT0) shows the form table for the figure data stored in the figure ROM 23 when the figure data is deformed. The form table is divided into the two data parts: the header data and the table data. The number of vertical PIXEL position values and the number of horizontal PIXEL position values are stored in the header data. In the table data, it is considered that pixels which are transparent and not displayed exist in the region to be displayed in order that background and the like can be viewed. Information indicative of this pixel which is transparent is added to the vertical PIXEL position value or the horizontal PIXEL position value. The position of each pixel is calculated by the following equation:

(Display/Non-Display Information)×(Number of Vertical PIXEL Position Values (h))×(Number of Horizontal PIXEL Position Values (h))+(Horizontal PIXEL Position Value (h))×(Number of Vertical PIXEL Position Values (h))+(Vertical PIXEL Position Value (h)).

Then, the data in which values obtained from the above equation are listed is stored in the form table memory 34 or 34'.

In the form table of the table 5, the elements are rotated by 90 degrees, compared with the form table of table 1. Thus, by referring to the form table of the table 5, the rotated figure can be displayed.

In the first and second embodiment, the figure is deformed. However, if the X coordinate address origin value P1 and Y coordinate address origin value P2 of the OBJ table

TABLE 5

Form Table Data Values of FT0

Header Data

| the number oc vertical PIXEL position values 10(h) | the number of horizontal PIXEL position values 10(h) |
|---|---|

Table Data

Table Data = (display/non-display bit) × (the number of vertical PIXEL position values (h)) × (the number of horizontal PIXEL position values (h)) + (vertical PIXEL position value (h)) × (the number of horizontal PIXEL position values (h)) + (horizontal PIXEL position values (h))

| | | | | | | | | | | | | | | | |
|---|---|---|---|---|---|---|---|---|---|---|---|---|---|---|---|
| 000(h) | 010(h) | 020(h) | 030(h) | 040(h) | 050(h) | 060(h) | 070(h) | 080(h) | 090(h) | 0A0(h) | 0B0(h) | 0C0(h) | 0D0(h) | 0E0(h) | 0F0(h) |
| 000(h) | 010(h) | 020(h) | 030(h) | 040(h) | 050(h) | 060(h) | 070(h) | 080(h) | 090(h) | 0A0(h) | 0B0(h) | 0C0(h) | 0D0(h) | 0E0(h) | 0F0(h) |
| 001(h) | 011(h) | 021(h) | 031(h) | 041(h) | 051(h) | 061(h) | 071(h) | 081(h) | 091(h) | 0A1(h) | 0B1(h) | 0C1(h) | 0D1(h) | 0E1(h) | 0F1(h) |
| 002(h) | 012(h) | 022(h) | 032(h) | 042(h) | 052(h) | 062(h) | 072(h) | 082(h) | 092(h) | 0A2(h) | 0B2(h) | 0C2(h) | 0D2(h) | 0E2(h) | 0F2(h) |
| 003(h) | 013(h) | 023(h) | 033(h) | 043(h) | 053(h) | 063(h) | 073(h) | 083(h) | 093(h) | 0A3(h) | 0B3(h) | 0C3(h) | 0D3(h) | 0E3(h) | 0F3(h) |
| 004(h) | 014(h) | 024(h) | 034(h) | 044(h) | 054(h) | 064(h) | 074(h) | 084(h) | 094(h) | 0A4(h) | 0B4(h) | 0C4(h) | 0D4(h) | 0E4(h) | 0F4(h) |
| 005(h) | 015(h) | 025(h) | 035(h) | 045(h) | 055(h) | 065(h) | 075(h) | 085(h) | 095(h) | 0A5(h) | 0B5(h) | 0C5(h) | 0D5(h) | 0E5(h) | 0F5(h) |
| 006(h) | 016(h) | 026(h) | 036(h) | 046(h) | 056(h) | 066(h) | 076(h) | 086(h) | 096(h) | 0A6(h) | 0B6(h) | 0C6(h) | 0D6(h) | 0E6(h) | 0F6(h) |
| 007(h) | 017(h) | 027(h) | 037(h) | 047(h) | 057(h) | 067(h) | 077(h) | 087(h) | 097(h) | 0A7(h) | 0B7(h) | 0C7(h) | 0D7(h) | 0E7(h) | 0F7(h) |
| 008(h) | 018(h) | 028(h) | 038(h) | 048(h) | 058(h) | 068(h) | 078(h) | 088(h) | 098(h) | 0A8(h) | 0B8(h) | 0C8(h) | 0D8(h) | 0E8(h) | 0F8(h) |
| 009(h) | 019(h) | 029(h) | 039(h) | 049(h) | 059(h) | 069(h) | 079(h) | 089(h) | 099(h) | 0A9(h) | 0B9(h) | 0C9(h) | 0D9(h) | 0E9(h) | 0F9(h) |
| 00A(h) | 01A(h) | 02A(h) | 03A(h) | 04A(h) | 05A(h) | 06A(h) | 07A(h) | 08A(h) | 09A(h) | 0AA(h) | 0BA(h) | 0CA(h) | 0DA(h) | 0EA(h) | 0FA(h) |
| 00B(h) | 01B(h) | 02B(h) | 03B(h) | 04B(h) | 05B(h) | 06B(h) | 07B(h) | 08B(h) | 09B(h) | 0AB(h) | 0BB(h) | 0CB(h) | 0DB(h) | 0EB(h) | 0FB(h) |
| 00C(h) | 01C(h) | 02C(h) | 03C(h) | 04C(h) | 05C(h) | 06C(h) | 07C(h) | 08C(h) | 09C(h) | 0AC(h) | 0BC(h) | 0CC(h) | 0DC(h) | 0EC(h) | 0FC(h) |
| 00D(h) | 01D(h) | 02D(h) | 03D(h) | 04D(h) | 05D(h) | 06D(h) | 07D(h) | 08D(h) | 09D(h) | 0AD(h) | 0BD(h) | 0CD(h) | 0DD(h) | 0ED(h) | 0FD(h) |
| 00E(h) | 01E(h) | 02E(h) | 03E(h) | 04E(h) | 05E(h) | 06E(h) | 07E(h) | 08E(h) | 09E(h) | 0AE(h) | 0BE(h) | 0CE(h) | 0DE(h) | 0EE(h) | 0FE(h) |
| 00F(h) | 01F(h) | 02F(h) | 03F(h) | 04F(h) | 05F(h) | 06F(h) | 07F(h) | 08F(h) | 09F(h) | 0AF(h) | 0BF(h) | 0CF(h) | 0DF(h) | 0EF(h) | 0FF(h) | section 16 are changed, the figure can be shifted. Therefore, the first and second embodiments and the embodiment are combined, the figure can be shifted and rotated to any angle at the same time.

As mentioned above, according to the first to third embodiments of the present invention, each of the display figure example 1 (sp1) and the display figure example 2 (sp2) is considered to be a single figure to be deformed and displayed. In this case, the display figures themselves can be freely deformed by setting the form table data indicative of the respective shapes without switching and changing the input of the figure ROM data. Also, the pixel addresses after a complex deformation are calculated by the external CPU 21 as a host apparatus rather than the 2D graphic processor 22, and are written in the form table, or the existing form table is only correlated. Thus, the vast circuit except the table is not required, which makes the circuit structure simpler.

According to the first to third embodiments of the present invention, the processes are carried out while the content of the form table values are referred to. Thus, any figure can be freely deformed. Also, since the form table values can be freely set, the form of the display figure can be freely deformed. Further, since the values of the form table data stored in the table storing means can be freely rewritten, the function of freely deforming the figure can be largely improved.

Also, since the origin address of the form table can be recognized from the header (X,Y size), a figure can be deformed and displayed to have any size. For example, the figure data having the 16×16 pixels is read as the original figure data and can be freely deformed into figure data to have a larger number of pixels or a smaller number of pixels while referring to the form table data.

For example, in case where the free deformations of four patterns are performed to a single figure, when there are n figures to be displayed, a capacity of 4×n ROMs are required. A capacity of 800 ROMs are currently needed in order to display approximately 200 figures on the screen. However, according to the first to third embodiments, the image processing apparatus can be constituted by using a capacity of 200 ROMs and table regions corresponding to four form table data. Moreover, the deformation forms can be infinitely combined.

As mentioned above, the present invention is described on the basis of the preferable embodiments. However, the image processing apparatus and the image processing method of the present invention are not limited only to the above mentioned embodiments. Hence, the image processing apparatus and the image processing method to which various modifications and changes performed based on the above mentioned embodiments are applied are included in the scope of the present invention.

As explained above, according to the present invention, it is possible to freely perform the process of deforming the figure and also possible to reduce the amount of the information required to freely deform the figure to thereby reduce the rom capacity.

What is claimed is:

1. An image processing apparatus comprising:
a figure data storage unit for storing a figure data for a figure, pixels of said figure data being allocated with figure data addresses;
a display buffer unit for storing a display figure data;
an object table unit for storing an object table which storing a set of display parameters for a deformed figure of said figure, wherein said object table unit outputs said set of display parameters in response to an object designating instruction; and
an address generating unit for storing at least a form table which stores ones of said figure data addresses for said deformed figure as deformed figure addresses, wherein said address generating unit outputs, as read addresses, addresses including said deformed figure addresses to said figure data storage unit based on said set of display parameters supplied from said object table unit to read out at least a portion of said figure data from said figure data storage unit, and stores said read out figure data portion in said display buffer unit as said display figure data.

2. An image processing apparatus according to claim 1, further comprising a host unit for setting said form table in said address generating unit.

3. An image processing apparatus according to claim 1, further comprising a host unit for setting said set of display parameters in said object table unit.

4. An image processing apparatus according to claim 3, wherein said deformed figure is deformed to produce a twice deformed figure, said host unit sets a new form table corresponding to said twice deformed figure in said address generating unit, and a new set of display parameters in said object table unit.

5. An image processing apparatus according to claim 1, wherein said deformation is at least one of a shifting operation, a rotating operation, and a shifting and rotating operation of said figure.

6. An image processing apparatus according to claim 1, wherein said object table stores a plurality of sets of display parameters, and said address generating unit includes a plurality of form tables, and
wherein said address generating unit includes an instruction storage unit for storing a plurality of said object designating instructions.

7. An image processing apparatus according to claim 1, said set of display parameters includes a data indicative of a display position where said deformed figure is displayed, and
wherein said address generating unit generates reference addresses and outputs display buffer storage addresses based on said display position data and said reference addresses, when said read out figure data portion is stored in said display buffer unit.

8. An image processing apparatus according to claim 1, said set of display parameters includes a figure data designating data for designating said figure data and a form table designating data for designating for said form table, and
wherein said address generating unit includes:
a figure data address generating unit for generating reference addresses based on said form table designating data;
a form table storage unit for storing said form table, and for generating said deformed figure addresses based on said reference addresses generated by said figure data address generating unit;
a selector unit for selecting one of said reference addresses supplied from said figure data address generating unit and said deformed figure addresses based on an address selection control instruction; and
an address adder for adding said figure data designating data and said selected addresses to output to said figure data storage unit as said read addresses.

9. An image processing apparatus according to claim 8, further comprising a free deformation determining unit for determining whether or not there is any form table corresponding to said form table designating data, and for outputting said address selection control instruction to said selector unit based on said determining result.

10. An image processing apparatus according to claim 9, wherein said selector unit selects said deformed figure addresses when it is determined that there is said form table corresponding to said form table designating data in said form table storage unit, and said figure data addresses when it is determined that there is not any form table corresponding to said form table designating data in said form table storage unit.

11. An image processing apparatus according to claim 8, wherein said form table has a data indicative of a size of said deformed figure, and said figure data address generating unit generates said reference addresses based on said deformed figure size data when it is determined that there is said form table corresponding to said form table designating data in said form table storage unit.

12. An image processing apparatus according to claim 1, wherein said object table unit stores another set of display parameters for said figure data stored in said figure data storage unit, and wherein said address generating unit stores said figure data addresses for said figure, and outputs said figure data addresses as said read addresses to said figure data storage unit before the deformation of said figure.

13. An image processing apparatus according to claim 12, wherein said address generating unit includes:

a figure data address generating unit for generating reference addresses based on said form table designating data;

a form table storage unit for storing said for m table, and for generating said deformed figure addresses based on said reference addresses generated by said figure data address generating unit; and an address adder for adding said figure data designating data and said deformed figure addresses to output to said figure data storage unit as said read addresses.

14. An image processing apparatus according to claim 13, wherein said form table has a data indicative of a size of said deformed figure, and said figure data address generating unit generates said addresses based on said deformed figure size data.

15. A method of displaying a freely deformed image comprising the steps of:

out putting a set of display parameters of an object table in response to an object designating instruction, an object table storing said set of display parameters for a deformed figure of an original figure;

outputting, as read addresses, addresses including deformed figure addresses to a figure data storage unit based on said set of display parameters to read out at least a portion of a figure data from said figure data storage unit, wherein a figure data storage unit stores said figure data for said original figure, pixels of said figure data being allocated with figure data addresses, and a form table stores ones of said figure data addresses for said deformed figure as said deformed figure addresses; and storing said read out figure data portion in a display buffer unit as said display figure data.

16. A method according to claim 15, further comprising the step of setting said form table.

17. A method according to claim 15, further comprising the step of setting said set of display parameters.

18. A method according to claim 15, further comprising the step of, when said deformed figure is deformed to produce a twice deformed figure, setting a new form table corresponding to said twice deformed figure and a new set of display parameters.

19. A method according to claim 15, wherein said deformation is at least one of a shifting operation, a rotating operation, and a shifting and rotating operation of said figure.

20. A method according to claim 15, wherein a plurality of sets of display parameters are set in said object table and a plurality of form tables are set, and wherein said method further comprises the step of sequentially generating a plurality of said object designating instructions one by one.

21. A method according to claim 15, said set of display parameters includes a data indicative of a display position where said deformed figure is displayed, and wherein said step of outputting addresses including deformed figure addresses includes generating reference addresses based on said based on said set of display parameters, and wherein said step of storing said read out figure data portion includes outputting display buffer storage addresses based on said display position data and said reference addresses, when said read out figure data portion is stored In said display buffer unit.

22. A methods according to claim 15, said set of display parameters includes a figure data designating data for designating said figure data and a form table designating data for designating for said form table, and wherein said step of outputting addresses including deformed figure addresses includes:

generating reference addresses based on said form table designating data;

generating said deformed figure addresses based on said reference addresses:

selecting one of said reference addresses supplied and said deformed figure addresses based on an address selection control instruction; and adding said figure data designating data and said selected addresses to output to said figure data storage unit as said read addresses.

23. A method according to claim 22, further comprising the steps of:

determining whether or not there is any form table corresponding to said form table designating data; and outputting said address selection control instruction based on said determining result.

24. A method according to claim 23, wherein said selecting step includes selecting said deformed figure addresses when it is determined that said form table designating data designates said form table, and said figure data addresses when it is determined that said form table designating data designates no form table.

25. A method according to claim 22, wherein said form table has a data indicative of a size of said deformed figure, and wherein said step of generating reference addresses includes generating said reference addresses based on said deformed figure size data, when it is determined that said form table designating data designates said form table.

26. A method according to claim 15, wherein said object table stores another set of display parameters for said figure data stored in said figure data storage unit, and wherein said step of outputting addresses including deformed figure addresses includes outputting said figure data addresses as said read addresses before the deformation of said figure.

27. A method according to claim 26, wherein said step of outputting addresses including deformed figure addresses includes:

generating reference addresses based on said form table designating data;

generating said deformed figure addresses based on said reference addresses; and adding said figure data designating data and said deformed figure addresses as said read addresses.

28. A method according to claim 27, wherein said form table has a data indicative of a size of said deformed figure, and wherein said step of outputting addresses including deformed figure addresses includes generating said reference addresses based on said deformed figure size data.

* * * * *